(12) United States Patent
Yoshinaga et al.

(10) Patent No.: US 10,943,194 B2
(45) Date of Patent: Mar. 9, 2021

(54) PRODUCT CHEMICAL PROFILE SYSTEM

(71) Applicant: The Boeing Company, Chicago, IL (US)

(72) Inventors: Jay Kenji Yoshinaga, Gardena, CA (US); Frank Samuel Holman, III, Woodinville, WA (US); Mark Arnold Dahl, Kent, WA (US); John Michael Caddick, Lake Forest, CA (US); Philip Won Jin Chung, Eastvale, CA (US); Fred Milton Cruz, Fountain Valley, CA (US); Brian Byungkyu Kim, Fullerton, CA (US); Elizabeth Thelma Montague, Huntington Beach, CA (US); Michael Mark Scheiern, La Habra Heights, CA (US); Patric Roy Gillies, Monroe, WA (US); John Terry Monahan, Seattle, WA (US); Richard Loran Williams, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 1537 days.

(21) Appl. No.: 14/478,871

(22) Filed: Sep. 5, 2014

(65) Prior Publication Data
US 2015/0120363 A1 Apr. 30, 2015

Related U.S. Application Data

(60) Provisional application No. 61/895,651, filed on Oct. 25, 2013.

(51) Int. Cl.
*G06Q 10/06* (2012.01)
*G06F 16/248* (2019.01)
(Continued)

(52) U.S. Cl.
CPC ..... *G06Q 10/06312* (2013.01); *G06F 16/248* (2019.01); *G06F 16/24575* (2019.01); *G06Q 30/018* (2013.01)

(58) Field of Classification Search
CPC ........................ G06Q 10/063; G06Q 10/06312
See application file for complete search history.

(56) References Cited

U.S. PATENT DOCUMENTS 6,163,732 A * 12/2000 Petke ..................... G06Q 99/00
700/106
6,823,342 B2 * 11/2004 Wallen ............... G05B 19/4097
(Continued)

FOREIGN PATENT DOCUMENTS

WO 9930265 A1 6/1999

OTHER PUBLICATIONS

Jonathan Vance et al, Component, Context, and Manufacuring Model Library (C2M2L), Air Force Research Laboratory Materials and Manufacturing Directorate Wright-Patterson Air Force Base, pp. 1-541 (Year: 2012).*

(Continued)

*Primary Examiner* — Andre D Boyce
(74) *Attorney, Agent, or Firm* — Yee & Associates, P.C.

(57) ABSTRACT

A computer-implemented system and method for obtaining product related information. Information related to a product obtained from a plurality of different sources is transformed into processed product data with a plurality of levels. Callouts and contexts are identified in the processed product data. A product-to-chemical continuum is generated by creating callout-context pathway segments between the plurality of levels of the processed product data based on the callouts and contexts identified. A query request for product information is transformed into a set of context search parameters, which is used to traverse the product-to-chemi- (Continued)

cal continuum through the callout-context pathway segments that span the plurality of levels. The product information that matches the set of context search parameters is extracted from the product-to-chemical continuum. The callout-context pathway segments reduce processing resources and time needed to obtain the product information.

18 Claims, 17 Drawing Sheets

(51) Int. Cl.
*G06F 16/2457* (2019.01)
*G06Q 30/00* (2012.01)

(56) References Cited

U.S. PATENT DOCUMENTS

| | | | |
|---|---|---|---|
| 7,010,544 B2* | 3/2006 | Wallen | G05B 19/4097 |
| | | | 707/791 |
| 2002/0049548 A1 | 4/2002 | Bunin | |
| 2003/0014191 A1 | 1/2003 | Agrafiotis et al. | |
| 2003/0155415 A1* | 8/2003 | Markham | G06Q 10/00 |
| | | | 235/376 |
| 2005/0199789 A1 | 9/2005 | Niermann et al. | |
| 2007/0198126 A1 | 8/2007 | Black et al. | |
| 2008/0300994 A1* | 12/2008 | Kulak | G06Q 10/08 |
| | | | 705/23 |
| 2009/0069920 A1* | 3/2009 | Franzen | G06Q 10/06 |
| | | | 700/97 |
| 2012/0281012 A1* | 11/2012 | Neway | G06Q 10/10 |
| | | | 345/619 |
| 2012/0310911 A1* | 12/2012 | Harrison | G06F 19/709 |
| | | | 707/706 |
| 2013/0013993 A1* | 1/2013 | Oh | G06F 17/5009 |
| | | | 715/212 |
| 2013/0238511 A1 | 9/2013 | Van der Veen | |

OTHER PUBLICATIONS

International Preliminary Report on Patentability, dated Apr. 26, 2016, regarding Application No. PCT/US2014/056220, 9 pages.
Extended European Search Report, dated May 22, 2017, regarding Application No. EP14778018.3, 12 pages.
International Search Report and Written Opinion, dated Apr. 14, 2015, regarding Application No. PCT/US2014/056220, 13 pages.
European Patent Office Communication Report, dated Dec. 13, 2018, regarding Application No. 14778018.3, 11 pages.
Canadian Intellectual Property Office Examination Search Report, dated Dec. 14, 2018, regarding Application No. 2,922,401, 5 pages.
Canadian Office Action, dated Jan. 7, 2020, regarding Application No. 2,922,401, 6 pages.
EP Oral Proceedings Summons dated Feb. 18, 2020, regarding Application No. 14778018.3, 9 pages.

* cited by examiner

PRODUCT CHEMICAL PROFILE SYSTEM

RELATED PROVISIONAL APPLICATION

This application claims the benefit of U.S. Provisional Patent Application Ser. No. 61/895,651, filed Oct. 25, 2013, and entitled "Product Chemical Profile System," which is incorporated herein by reference in its entirety.

BACKGROUND INFORMATION

1. Field

The present disclosure relates generally to processing information related to a product. More particularly, the present disclosure relates to a method and apparatus for generating a product-to-chemical continuum comprised of callout-context pathway segments and for generating output files using the product-to-chemical continuum.

2. Background

As used herein, a "product" may be anything that is manufactured using one or more parts. A part may be comprised of any number of materials. Further, any number of materials may be consumed during the manufacturing of a product. A material may be comprised of one or more chemical substances. As used herein, a "chemical substance" may be a chemical element or a chemical compound. A chemical substance may have a unique chemical composition.

Certain products may have restrictions as to the types and weights of chemical substances that can be used or consumed in the manufacturing of these products. For example, military products and commercial products may have restrictions limiting the types and weights of chemicals that can be used or consumed in the manufacturing of these products. These restrictions may include, but are not limited to, contractual restrictions and regulatory restrictions.

The restrictions placed on the types and weights of chemicals used and consumed in the manufacturing of a product may change over time. In some cases, an industry may phase out one or more chemical substances in anticipation of impending regulatory changes. Changes in the restrictions for chemical substances may require changes to the chemical make-up of various parts that make up the product.

Determining which parts are affected by changes in the restrictions for certain chemical substances may be a time-consuming and costly process. The chemical make-up of each part in the product as well as the manufacturing processes used in the manufacturing of each part in the product may need to be considered in order to meet requirements for chemical composition and chemical weight. The information needed to determine which parts are affected and how the overall manufacturing process may be affected may be found within various sources located in different locations.

Extensive manual research of part drawings, material specifications, bills of materials, and other types of related documentation may be needed. This type of manual research may be more tedious, labor-intensive, time-consuming, and expensive than desired. For example, manufacturing a vehicle may involve assembling tens of thousands or hundreds of thousands of parts. Identifying the information needed to accurately identify the chemical compositions and chemical weights of the vehicle, as well as assemblies and subassemblies formed during the manufacturing of the vehicle may be extremely time-consuming and labor-intensive using currently available research techniques and systems.

Additionally, a need may be present for methods that capture the environmental footprint of manufactured chemicals and products. Current methods may lack the ability to identify high-leverage chemical building blocks that affect the overall environmental footprint of an end product, which may in turn, hinder identifying a more environmentally friendly or sustainable approach. Therefore, it would be desirable to have a method and apparatus that take into account at least some of the issues discussed above, as well as other possible issues.

SUMMARY

In one illustrative embodiment, a computer-implemented system for obtaining product related information comprises a data manager, a continuum generator, and an output manager. The data manager transforms information related to a product obtained from a plurality of different sources into processed product data with a plurality of levels. The data manager identifies callouts and contexts in the processed product data. The continuum generator generates a product-to-chemical continuum by creating callout-context pathway segments between the plurality of levels of the processed product data based on the callouts and contexts. The output manager transforms a query request for product information into a set of context search parameters, which is used to traverse the product-to-chemical continuum through the callout-context pathway segments that span the plurality of levels. The output manager extracts the product information that matches the set of context search parameters from the product-to-chemical continuum, wherein the callout-context pathway segments reduce processing resources and time needed to obtain the product information.

In another illustrative embodiment, a computer-implemented system for obtaining product related information comprises a data manager, a continuum generator, and an output manager. The data manager is configured to transform information related to a product that is obtained from a plurality of different sources in different formats into a plurality of levels of processed product data having a selected format. The data manager is further configured to identify a plurality of callouts and a plurality of contexts at each level in the plurality of levels of the processed product data. The continuum generator comprises a data processor that creates callout-context pathway segments between the plurality of levels of the processed product data using the plurality of callouts and the plurality of contexts at each level in the plurality of levels of the processed product data to generate a product-to-chemical continuum and stores the product-to-chemical continuum that comprises a plurality of pathway segments that include the callout-context pathway segments in a data store. The output manager transforms a query request for desired information related to the product into a set of context search parameters, traverses a pathway in the product-to-chemical continuum formed by at least a portion of the callout-context pathway segments based on the set of context search parameters to extract the desired information related to the product, and generates an output file containing the desired information. The callout-context pathway segments between the plurality of levels of the processed product data reduce processing resources and time needed by the computer-implemented system to obtain the desired information and generate the output file containing the desired information.

In yet another illustrative embodiment, a computer-implemented method for obtaining product related information is provided. Information related to a product obtained from a plurality of different sources is transformed into processed product data with a plurality of levels. Callouts and contexts are identified in the processed product data. A product-to-chemical continuum is generated by creating callout-context pathway segments between the plurality of levels of the processed product data based on the callouts and contexts identified. A query request for product information is transformed into a set of context search parameters, which is used to traverse the product-to-chemical continuum through the callout-context pathway segments that span the plurality of levels. The product information that matches the set of context search parameters is extracted from the product-to-chemical continuum. The callout-context pathway segments reduce processing resources and time needed to obtain the product information.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
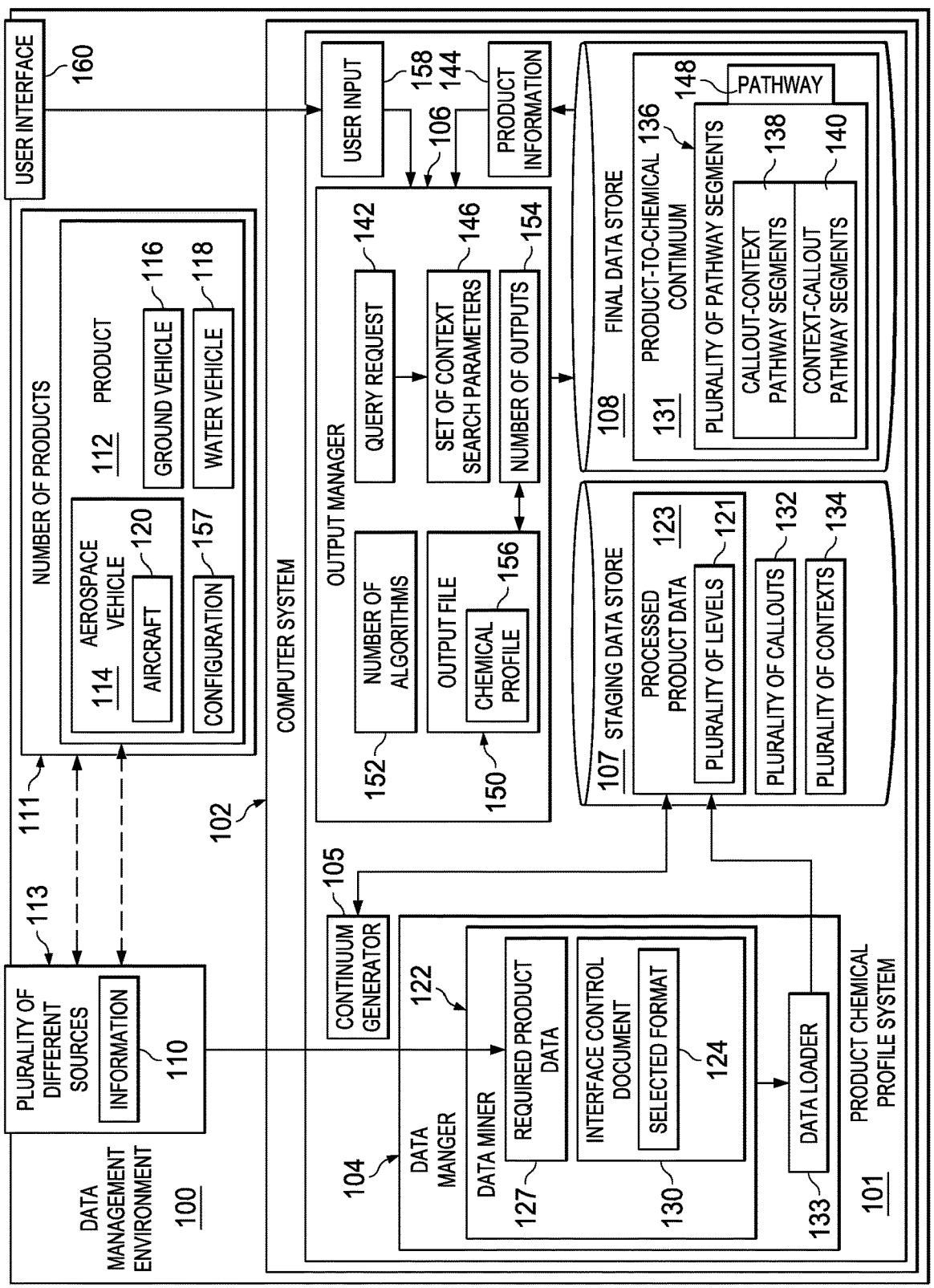
FIG. 1 is an illustration of a data management environment in the form of a block diagram in accordance with an illustrative embodiment.

The illustrative embodiments recognize and take into account different considerations. For example, the illustrative embodiments recognize and take into account that it may be desirable to have a system capable of merging information related to a product from a variety of different sources together into a single database for use in obtaining information related to any configuration of the product on-demand. In particular, it may be desirable to have a system capable of generating a chemical profile for any configuration of the product on-demand. In this manner, the system may be capable of providing the technical effect of "chemical awareness" with respect to the produce on-demand.

Thus, the illustrative embodiments provide a product chemical profile system for obtaining and transforming product-related information. In one illustrative example, the product chemical profile system merges and transforms information related to a product that is obtained from a variety of sources into a plurality of levels of processed product data. The product chemical profile system generates a product-to-chemical continuum using the plurality of levels of the processed product data. In generating the product-to-chemical continuum, the product chemical profile system recognizes and takes into account the following: a product may be comprised of any number of parts; parts may be associated with engineering notes; engineering notes may reference specifications; specifications may refer to materials, processes, or both; materials may be comprised of chemicals; and regulations may be in place for the handling and use of certain chemicals.

The product-to-chemical continuum provided by the illustrative embodiments may be open-ended and flexible such that any convention or scheme for breaking down parts into components, materials, chemical substances, and the elements of those chemical substances may be accommodated. This type of open-endedness and flexibility may be needed due to the high degree of variation across the various sources of the information related to the product with respect to naming conventions, classification schemes, and levels of specificity.

The illustrative embodiments provide a product chemical profile system capable of creating data relationships within the product-to-chemical continuum such that the information related to the product can be accessed by various types of algorithms to generate various types of reports. In particular, these data relationships may allow the product chemical profile system to move through the product-to-chemical continuum from one point along the continuum to another point along the continuum in either direction when searching for desired information related to the product. In other words, creating these data relationships may provide the technical effect of allowing the product-to-chemical continuum to be traversed and navigated in either direction from any starting point to any finishing point.

The data relationships in the product-to-chemical continuum may provide the information needed to identify the physical, logical, and functional connections between the various systems and components of systems in a complex product, particularly in the model-based systems engineering context. The various levels of the product-to-chemical continuum and the data relationships created between those levels may allow the physical, logical, and functional connections between the various systems and components of the systems in a complex product to be quickly and easily identified. These types of physical, logical, and functional connections may be made all the way down to the chemical level such that physical, logical, and functional relationships of the various chemical constituents to a product, components of the product, and processes used in the manufacturing and maintenance of the product may be identified. Identifying these types of physical, logical, and functional connections across a product from the chemical level all the way up to the product level may not be practical or feasible without using the product-to-chemical continuum.

Some examples of reports that may be generated using the product chemical profile system include reports that identify, without limitation, the materials used by a given set of parts, the different vendors that supply a given material, the chemical decomposition by weight of a given material, all of the uses of a particular type of chemical for a product, or some combination thereof. Other examples of reports include reports that identify, without limitation, all parts in a product that comprise a particular chemical substance, the locations of these parts with respect to the product, how much of a particular chemical substance is used in a part as determined by the geometry of the part, the surface area of the part, and the volume of the part, or some combination thereof.

The illustrative embodiments recognize and take into account that over time, different types of developments may occur that affect one or more of the design, development, manufacturing, or maintenance of a product. For example, over time, chemical restrictions may change, new chemical substances may be developed, new manufacturing processes may be developed, new design requirements or safety requirements for the product may be developed, new materials may be developed, other types of changes may occur, or some combination thereof may occur. Having a single database that provides the capability to analyze all information related to a product along the product-to-chemical continuum may provide the technical effect of reducing the time, effort, and cost associated with designing the manufacturing process for the product, modifying the manufacturing process over time, modifying the design of the product, or some combination thereof to accommodate these types of changes and new developments over time.

As one illustrative example, manufacturing a vehicle, such as an aircraft, may involve assembling tens of thousands, hundreds of thousands of parts, or millions of parts. The product chemical profile system provided by the illustrative embodiments may be capable of quickly and easily identifying the chemical compositions and chemical weights of the end product, the assemblies that make up the end product, the sub-assemblies that make up the end product, the parts that make up the end product, or some combination thereof. The chemical compositions and chemical weights identified may be used to generate one or more chemical profiles related to the product.

Complex products, such as aircraft, may have a product life cycle that spans decades. Other examples of complex products may include unmanned aerial vehicles, ships, space shuttles, space stations, and other types of vehicles. The product life cycle of a complex product, such as an aircraft, may range between about 25 years to about 65 years, depending on the type of aircraft and usage of the aircraft. During the life of a complex product, manufacturing operations, maintenance operations, rework operations, repair operations, and other type of operations may alter—in some cases chemically—the various constituents in the complex product. Further, a record of the different chemicals and materials used to perform these types of operations may not always be preserved over the life of the product.

Consequently, when issues arise later in the life of the product, performing root cause analysis to identify the primary cause of the issues may be much more difficult than desired. The original engineers, technicians, designers, and other operators involved early in the life of a product may not be available later in the life of that product. Consequently, obtaining crucial information at the chemical level of a product may be incredibly difficult. Further, reverse engineering a product may be prohibitively time-consuming and expensive, and in some cases, completely impractical and infeasible, with respect to complex products.

For example, identifying the particular chemical constituents that are related to a product by being part of the product or by being used to perform operations on the product and that may be of potential concern may be nearly impossible and in some cases, completely impossible, without the product-to-chemical continuum provided by the illustrative embodiments. Further, identifying all components of a product and all processes used during the entire life of a product that involve a particular restricted chemical constituent, such as cadmium, may be impossible without the product-to-chemical continuum provided by the illustrative embodiments.

The product-to-chemical continuum provided by the different illustrative embodiments provides a manner in which each and every chemical constituent used in any manner across the entirety of the product over the entire life cycle of the product may be tracked and easily and quickly identified. This type of product-to-chemical continuum may be crucial to the model-based systems engineering for a complex product, such as an aircraft, and managing the various systems of this product.

Further, the product chemical profile system may be able to track, report, and verify compliance of these one or more chemical profiles with respect to contractual, regulatory and industry standards in order to obtain a desired end product. Still further, the product chemical profile system may be capable of overcoming the technical hurdles associated with collecting, merging, and transforming the information from different types of sources for use in generating a chemical profile for any configuration of the product on-demand using the data relationships that make up the product-to-chemical continuum.

Additionally, the product chemical profile system provided by the illustrative embodiments may allow the environmental footprint of manufactured chemicals and products to be generated with increased speed and efficiency but without increasing expenses in an undesired manner. The product chemical profile system may provide the ability to identify high-leverage chemical building blocks that affect the overall environmental footprint of an end product, which may, in turn, significantly aid in the identification of a more environmentally friendly or sustainable approach.

Thus, the illustrative embodiments may provide a computer-implemented product chemical profile system and computer-implemented method for obtaining product related information, such as, for example, without limitation, a chemical profile for a product. In one illustrative example, the product chemical profile system creates a product-to-chemical continuum comprised of callout-context pathway segments that may be traversed to reduce the processing resources and time needed by the product chemical profile system to obtain the desired product related information and generate an output file containing this desired product related information.

The various pathway segments in the product-to-chemical continuum linking various types of data items at different levels along the product-to-chemical continuum may improve the functioning of the computer-implemented product chemical profile system such that the processing resources and time needed to obtain the desired product related information and generate an output file containing this desired product related information are significantly reduced. The output file generated may then be used to perform operations in an immediate environment.

Referring now to the figures and, in particular, with reference to FIG. 1, an illustration of a data management environment is depicted in the form of a block diagram in accordance with an illustrative embodiment. Data management environment 100 may include product chemical profile system 101.

In this illustrative example, product chemical profile system 101 may be implemented using software, hardware, firmware, or a combination thereof. When software is used, the operations performed by product chemical profile system 101 may be implemented using, for example, without limitation, program code configured to run on a processor unit. When firmware is used, the operations performed by product chemical profile system 101 may be implemented using, for example, without limitation, program code and data and stored in persistent memory to run on a processor unit.

When hardware is employed, the hardware may include one or more circuits that operate to perform the operations performed by product chemical profile system 101. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In some illustrative examples, the operations and processes performed by product chemical profile system 101 may be performed using organic components integrated with inorganic components. In some cases, the operations and processes may be performed by entirely organic components, excluding a human being. As one illustrative example, circuits in organic semiconductors may be used to perform these operations and processes.

In one illustrative example, product chemical profile system 101 may be implemented within computer system 102. In other words, product chemical profile system 101 may be a computer-implemented system. Product chemical profile system 101 may also be referred to as a computer-implemented product chemical profile system.

Computer system 102 may be comprised of one or more computers. When more than one computer is present in computer system 102, these computers may be in communication with each other. The computers may be located in a same location or different locations, depending on the implementation.

As depicted, product chemical profile system 101 may include data manager 104, continuum generator 105, output manager 106, staging data store 107, and final data store 108. Each of data manager 104, continuum generator 105, and output manager 106 may be implemented using hardware, software, firmware, or some combination thereof.

In some illustrative examples, data manager 104, continuum generator 105, and output manager 106 may all be implemented within the same computer in computer system 102. However, in other examples, each of data manager 104, continuum generator 105, and output manager 106 may be implemented in a different computer in computer system 102.

Staging data store 107 and final data store 108 may take the form of, for example, without limitation, databases. In other illustrative examples, staging data store 107 and final data store 108 may take the form of data repositories, data warehouses, or some other form of data storage. In some cases, staging data store 107 and final data store 108 may be implemented on a same server or on different servers in computer system 102. In other illustrative examples, staging data store 107, final data store 108, or both may be stored on one or more server computers located remotely with respect to computer system 102.

Data manager 104 may obtain information 110 from plurality of different sources 113. Information 110 may be related to number of products 111. As used herein, a "number of" items may include one or more items. In this manner, number of products 111 may include one or more products.

A source in plurality of different sources 113 may take a number of different forms. For example, a source in plurality of different sources 113 may take the form of at least one of, for example, without limitation, a paper document, a binder, an electronic document, a database, a server, an audio file, photographic film, a microform, a flash drive, a compact disc, a digital optical disc, some other type of physical document or representation, or some other type of electronic media.

As used herein, the phrase "at least one of," when used with a list of items, means different combinations of one or more of the listed items may be used and only one of the items in the list may be needed. The item may be a particular object, thing, action, process, or category. In other words, "at least one of" means any combination of items or number of items may be used from the list, but not all of the items in the list may be required.

For example, "at least one of item A, item B, or item C" or "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In one illustrative example, each source in plurality of different sources 113 is an authoritative source. An "authoritative source" may be a source that is known to be at least one of reliable, created by one or more experts or skilled persons, reviewed and authorized by one or more experts or skilled persons, created by a regulatory agency, authenticated by one or more experts or skilled persons, or deemed reliable in some other manner.

Figure 2:
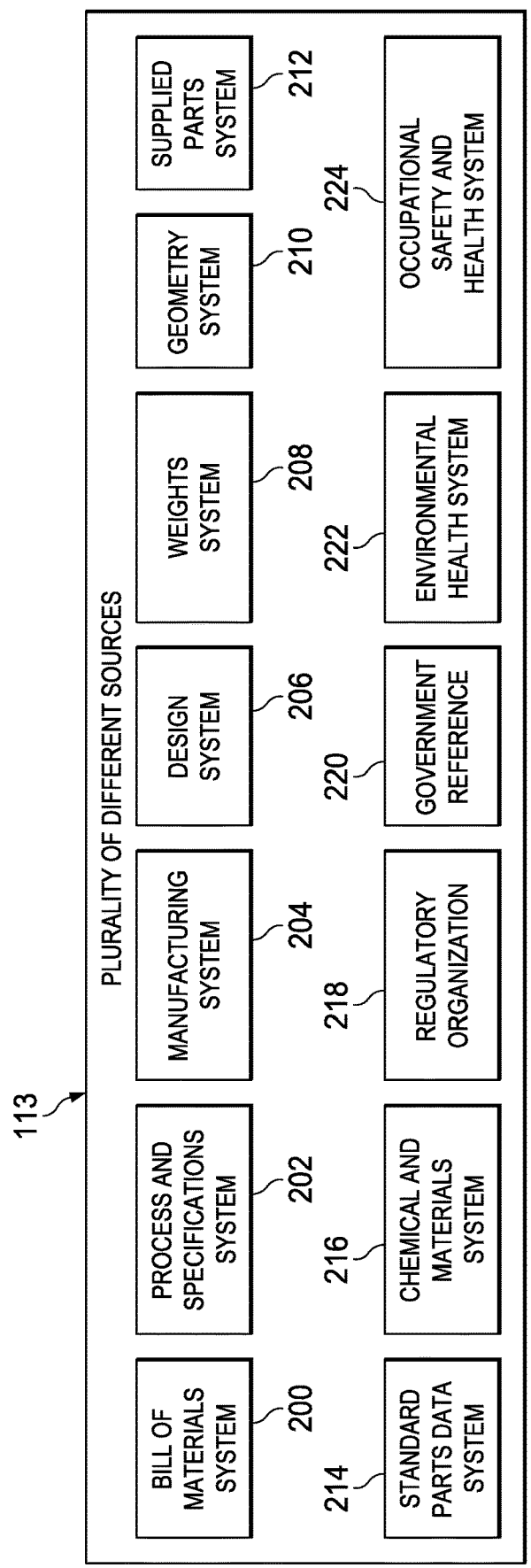
FIG. 2 is an illustration of a plurality of different sources in the form of a block diagram in accordance with an illustrative embodiment.

Plurality of different sources 113 includes at least two sources that are different. Examples of sources that may be included in plurality of different sources 113 are depicted in FIG. 2, described below.

Further, information 110 obtained from plurality of different sources 113 may be in different formats. For example, information 110 obtained from at least one source in plurality of different sources 113 may be in a different format compared to information 110 from at least one other source in plurality of different sources 113. The format of the information may be determined by at least one of the programming language in which the information is coded, the program by which information can be accessed, the organization and arrangement of the information, the naming conventions used, the classification schemes used, or some combination thereof.

Product 112 is an example of one of number of products 111. Product 112 may be any object that can be manufactured. Depending on the implementation, product 112 may be a physical product that has already been manufactured or a theoretical product that has yet to be manufactured. In these illustrative examples, product 112 may be a complex product comprised of many parts, sub-assemblies, assemblies, systems, or combination thereof. For example, without limitation, product 112 may be comprised of hundreds, thousands, tens of thousands, hundreds of thousands, or millions of parts.

Product 112 may take a number of different forms. For example, product 112 may take the form of aerospace vehicle 114, ground vehicle 116, water vehicle 118, or some other type of vehicle or platform. In one illustrative example, aerospace vehicle 114 may take the form of aircraft 120. Of course, in other illustrative examples, product 112 may take some other form. For example, product 112 may take the form of a satellite, an engine system, a fuel system, a wing for an aircraft, a desk, a robot, a building, a piece of equipment, a drilling tool, a container, a conduit, or some other type of product.

Information 110 related to product 112 may be referred to as product information and may include any type of content related to product 112 that is stored in or on plurality of sources 113. Information 110 obtained by data manager 104 may be at least a portion of the product information that is stored in on plurality of different sources 113. Examples of the different types of information 110 related to product 112 that may be obtained from plurality of different sources 113 are depicted in FIG. 2, described further below.

Data manager 104 may transform information 110 related to product 112 that is obtained from plurality of different sources 113 in different formats into plurality of levels 121 of processed product data 123 having selected format 124. Data manager 104 stores processed product data 123 in staging data store 107.

In one illustrative example, data manager 104 includes data miner 122. In this example, data miner 122 may be implemented using hardware, software, firmware, or some combination thereof.

Data miner 122 may extract required product data 127 from information 110. As one illustrative example, data miner 122 may extract required product data 127 in the form of digital data from electronic media content stored in plurality of sources 113. In some illustrative examples, data miner 122 receives required product data 127 in the form of digital representations of information in physical form. For example, data miner 122 may receive a scanned image of a paper document in plurality of sources 113 and may extract required product data 127 from the paper document. In some cases, data miner 122 may be referred to as an information miner.

Data miner 122 processes required product data 127 to form processed product data 123 that is then stored in staging data store 107. Processed product data 123 is generated in selected format 124 that has been designated specifically for staging data store 107. Processed product data 123 may be generated in selected format 124 using interface control document 130.

Interface control document 130 defines selected format 124 for processed product data 123. In particular, interface control document 130 may define selected format 124 as the number of data types and the number of data formats to be used for processed product data 123. Data miner 122 may parse and format required product data 127 according to selected format 124 defined by interface control document 130 to form processed product data 123. In this manner, different portions of required product data 127 that are obtained from plurality of different sources 113 in different formats may be unified.

Depending on the implementation, data miner 122 may process required product data 127 as required product data 127 is extracted from information 110. In some cases, data miner 122 uses partially obtained required product data 127 to determine what further product data needs to be extracted from information 110.

Plurality of levels 121 of processed product data 123 may include the various levels into which product 112 may be broken. Each of plurality of levels 121 of processed product data 123 may include one or more data items corresponding to that level.

Plurality of levels 121 may include, for example, without limitation, at least one of a product level, an assembly level, a sub-assembly level, a parts level, a part notes level, a specification level, a material level, a chemical level, a regulations level, or some other type of level. An example of one implementation for plurality of levels 121 is described in further detail in FIG. 4 below.

Data manager 104 may also identify plurality of callouts 132 and plurality of contexts 134 at each level in plurality of levels 121 of processed product data 123. As used herein, each of plurality of callouts 132 at a particular level in plurality of levels 121 may be comprised of a set of callout attribute-value pairs that define a reference to a portion of data in a data item in another level in the plurality of levels. Each of plurality of contexts 134 at a particular level in plurality of levels 121 may be comprised of a set of context attribute-value pairs that identify a portion of data in a data item in that particular level.

Further, data manager 104 may also identify callouts that are embedded within the portions of data identified by contexts. For example, data manager 104 may identify an embedded callout within the portion of the data in a data item identified by a particular context. This embedded callout becomes one of plurality of callouts 132 that are at the same level in plurality of levels 121 as that particular context. Thus, the portion of data in a data item as identified by a context at a particular level may be referenced by a callout at a different level.

Data manager 104 may also include data loader 133. Data loader 133 may load processed product data 123 into staging data store 107. In particular, data loader 133 may load plurality of levels 121 of processed product data 123 along with plurality of callouts 132 and plurality of contexts 134 identified for each of plurality of levels 121 into staging data store 107.

Once processed product data 123 is stored in staging data store 107, continuum generator 105 may interact with plurality of levels 121 of processed product data 123 to create product-to-chemical continuum 131. In particular, continuum generator 105 creates data relationships between the different levels in plurality of levels 121 of processed product data 123 using plurality of callouts 132 and plurality of contexts 134 at each level. These data relationships and the plurality of levels 121 of processed product data 123 together form product-to-chemical continuum 131.

The data relationships that make up product-to-chemical continuum 131 may take the form of a plurality of pathway segments 136. Each of plurality of pathway segments 136 may be a link between a callout and a context. Plurality of pathway segments 136 may include callout-context pathway segments 138 and context-callout pathway segments 140.

Each of callout-context pathway segments 138 is a link between a callout in one of plurality of levels 121 of processed product data 123 and a context in another level, typically a lower level, in plurality of levels 121 of processed product data 123. Each of context-callout pathway segments 140 is a link between a context in one plurality of levels 121 of processed product data 123 and an embedded callout at the same level. An example of one manner in which a callout-context pathway segment and a context-callout pathway segment may be created is described below in greater detail in FIG. 6.

Product-to-chemical continuum 131 comprises plurality of pathway segments 136 and processed product data 123. Plurality of pathway segments 136 provide a way for traversing through processed product data 123 within product-to-chemical continuum 131. Each of plurality of pathway segments 136 may be traversed in either direction. In other words, each of callout-context pathway segments 138 and context-callout pathway segments 140 is bi-directional.

Continuum generator 105 may generate and store product-to-chemical continuum 131 in final data store 108. Further, continuum generator 105 may manage product-to-chemical continuum 131 stored in final data store 108 over time.

Output manager 106 may be configured to interact with final data store 108. Output manager 106 may receive and process requests, such as query requests, using product-to-chemical continuum 131 stored in final data store 108. For example, without limitation, output manager 106 may transform query request 142 for product information 144 related to product 112 into set of context search parameters 146. Product information 144 may also be referred to as product related information, desired product information, or simply desired information.

Output manager 106 may traverse pathway 148 in product-to-chemical continuum 131 formed by at least a portion of callout-context pathway segments 138 and, in some cases, at least a portion of context-callout pathway segments 140, based on set of context search parameters 146 to extract product information 144 related to product 112. Set of context search parameters 146 may include one or more attribute value pairs that may be used to locate the relevant pieces of data within final data store 108.

In particular, output manager 106 may traverse pathway 148 in product-to-chemical continuum 131 formed through any portion of plurality of levels 121 using any number of pathway segments in plurality of pathway segments 136 based on set of context search parameters 146 to extract product information 144 related to product 112. Output manager 106 may then generate output file 150 containing product information 144. Plurality of pathway segments 136, and in particular, callout-context pathway segments 138, between plurality of levels 121 of processed product data 123 may reduce the processing resources and time needed by the computer-implemented product chemical profile system 101 to obtain product information 144 and generate output file 150 containing product information 144.

In one illustrative example, output manager 106 may use number of algorithms 152 to interact with final data store 108. An algorithm in number of algorithms 152 may be configured to access and extract data stored in final data store 108 according to set of context search parameters 146 and specified requirements. For example, the algorithm may be configured to access and extract data from final data store 108 based on set of context search parameters 146 and the needs of a customer, a regulatory organization, a company executive, or some other type of user.

As one illustrative example, number of algorithms 152 may be run by output manager 106. For example, number of algorithms 152 may be uploaded to output manager 106. In some cases, number of algorithms 152 may be configured to interact with final data store 108 independently of output manager 106.

Number of algorithms 152 is configured to generate number of outputs 154. An output in number of outputs 154 may take a number of different forms. An output in number of outputs 154 may take the form of a table, a report, a spreadsheet, or some other type of output. In one illustrative example, output file 150 generated by output manager 106 may be comprised of all of number of outputs 154. In another illustrative example, output file 150 generated by output manager 106 may be just one of number of outputs 154.

Output file 150 may include chemical profile 156. For example, an algorithm in number of algorithms 152 may be configured to access and extract data from final data store 108 to generate, for example, chemical profile 156 for product 112.

In one illustrative example, chemical profile 156 may include a report that identifies a total weight of a chemical used in product 112. In particular, chemical profile 156 may identify the total weight of a chemical used in a particular configuration 157 for product 112. In some cases, chemical profile 156 may identify a weight of at least one chemical used in a particular configuration 157 of product 112.

Configuration 157 for product 112 may vary based on the options selected during the manufacturing of product 112. For example, product 112 being manufactured using a particular brand of parts may be considered one configuration for product 112, while product 112 manufactured using a different brand of parts may be considered another configuration for product 112.

In another example, product 112 may take the form of a wire. A first configuration for the wire may be the wire having a first diameter and a first length. A second configuration for the wire may be the wire having a second diameter that is different from the first diameter but the same first length. A third configuration for the wire may be the wire having the second diameter but a second length that is different from the first length.

The manner in which final data store 108 is formed allows data to be extracted from final data store 108 easily and quickly to generate a number of different types of reports. Plurality of levels 121 of processed product data 123 may be considered hierarchical levels of data in some cases. Each hierarchical level of data being considered is independent of all the hierarchical levels above that hierarchical level. In this manner, the data elements generated for that hierarchical level may be repeatedly used in generating reports for different types of materials, parts, assemblies, and products.

In some illustrative examples, output manager 106 may use user input 158 to generate output file 150. User input 158 may define the requirements for product information 144, output file 150, or both. For example, without limitation, user input 158 may define set of context search parameters 146, a format for the generation of output file 150, instructions for the generation of output file 150, or other information. User input 158 may be received through user interface 160 in output manager 106. In other illustrative examples, user interface 160 may be separate from but configured to interact with output manager 106.

Although processed product data 123 is described as being related to product 112, processed product data 123 may be related to number of products 111. In other words, plurality of levels 121 of processed product data 123 may be related to multiple products in some cases. Further, depending on the implementation, plurality of pathway segments 136 may be formed between callouts and contexts across multiple products such that product information 144 may be extracted for multiple products. For example, in some cases, pathway segments may be created between a particular piece of information identified by a particular context and each of a plurality of callouts in which each of the plurality of callouts is located in data corresponding to a different product.

With reference now to FIG. 2, an illustration of plurality of different sources 113 from FIG. 1 is depicted in the form of a block diagram in accordance with an illustrative embodiment. As depicted, plurality of different sources 113 may include various types of sources, some of which may not be related to other sources in plurality of different sources 113.

Plurality of different sources 113 may include, for example, without limitation, bill of materials (BOM) system 200, process and specifications system 202, manufacturing system 204, design system 206, weights system 208, geometry system 210, supplied parts system 212, standard parts data system 214, chemical and materials system 216, regulatory organization 218, government reference 220, environmental health system 222, and occupational safety and health system 224. Of course, in other illustrative examples, plurality of different sources 113 may only include a portion of the sources depicted. In some cases, plurality of different sources 113 may include other sources (not shown) in addition to or in place of the ones depicted.

Figure 3:
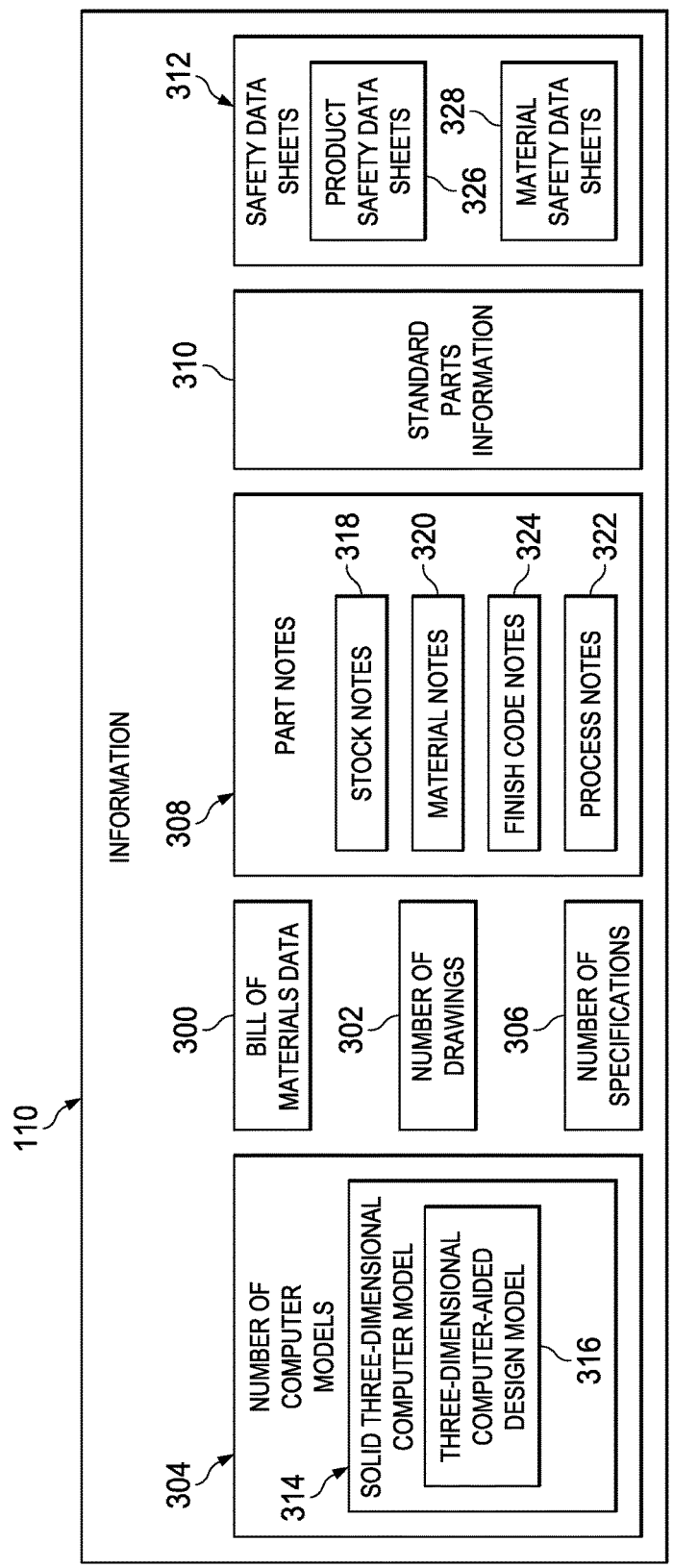
FIG. 3 is an illustration of information in the form of a block diagram in accordance with an illustrative embodiment.

With reference now to FIG. 3, an illustration of information from FIG. 1 is depicted in the form of a block diagram in accordance with an illustrative embodiment. As depicted, information 110 obtained from plurality of different sources 113 in FIGS. 1-2 may include various types of information.

In this illustrative example, information 110 obtained from plurality of different sources 113 may include bill of materials data 300, number of drawings 302, number of computer models 304, number of specifications 306, part notes 308, standard parts information 310, and safety data sheets 312. In some illustrative examples, information 110 may include only a portion of the different types of information depicted. In other illustrative examples, information 110 may include other types of information (not shown) in addition to or in place of the ones depicted.

Bill of materials data 300 may be obtained from bill of materials system 200 in FIG. 2. Bill of materials data 300 may include data from one or more bills of materials. A bill of materials for a product, such as product 112, may contain the list of and quantities of materials, assemblies, sub-assemblies, and parts needed to manufacture the product.

Bill of materials data 300 may be used to identify, for example, without limitation, upper levels 402 of hierarchy 400 in FIG. 4 below for a product, such as product 112 in FIG. 1. For example, when bill of materials data 300 is for product 112 in FIG. 1, bill of materials data 300 may be used to identify all possible configurations for product 112 at product level 406 depicted in FIG. 4 below, all major assemblies that make up product 112 at first assembly level 408 depicted in FIG. 4 below, all small assemblies that make up product 112 at second assembly level 410 depicted in FIG. 4 below, and all individual parts that make up product 112 at part level 412 depicted in FIG. 4 below.

Number of drawings 302 and number of computer models 304 may be obtained from at least one of bill of materials system 200, design system 206, or geometry system 210 in FIG. 2. In one illustrative example, number of drawings 302 and bill of materials data 300 may be stored on the same database in bill of materials system 200. This database may be referred to as a bill of materials database in some cases. Of course, in other illustrative examples, number of drawings 302 and bill of materials data 300 may be obtained from different sources.

A model in number of computer models 304 may be a three-dimensional model. In one example, the three-dimensional model takes the form of solid three-dimensional computer model 314. In some cases, solid three-dimensional (3D) computer model 314 may be, for example, three-dimensional computer-aided design (3D-CAD) model 316. Three-dimensional computer-aided design (3D-CAD) model 316 may represent a product, such as product 112 in FIG. 1, a major assembly in the product, a sub-assembly in the product, or an individual part in the product.

In this illustrative example, number of specifications 306 may include, for example, at least one of a material specification, a process specification, an industrial/military specification, or some other type of specification. Number of specifications 306 may be obtained from at least one of process and specifications system 202, chemical and materials system 216, regulatory organization 218, government reference 220, or manufacturing system 204 in FIG. 2.

Further, part notes 308 may include, for example, without limitation, stock notes 318, material notes 320, process notes 322, and finish code notes 324. In some cases, part notes 308 may be included in the bill of materials database described above. In some illustrative examples, part notes 308 may be included in bill of materials data 300. In other illustrative examples, number of part notes 308 may be obtained directly from at least one of bill of materials system 200, regulatory organization 218, government reference 220, or manufacturing system 204.

Stock notes 318 for a particular part contain the dimensions of raw materials used to make that part. Material notes 320 for a particular part contain the list of materials used on the part. Material notes 320 may further include or identify, for example, material specifications for these materials.

Process notes 322 for a particular part identify any process used to manufacture the particular part. Finish code notes 324 for a particular part identify the applied materials used on the particular part and the methods by which these materials are applied. Depending on the implementation, finish code notes 324 may be found within material notes 320, process notes 322, or both.

Standard parts information 310 may be obtained from, for example, without limitation, standard parts data system 214 in FIG. 2. Standard parts information 310 may include information about parts for which information is not typically found in bill of materials system 200. These parts may be, for example, standard parts used across various industries.

Safety data sheets 312 may include, for example, product safety data sheets (PSDS) 326 and material safety data sheets (MSDS) 328. Product safety data sheets 326 may include information about the safety requirements for product 112. Material safety data sheets 328 may include information about the safety requirements for the various materials used to manufacture product 112. These materials may include materials that make up one or more parts in product 112 and materials that are consumed by the manufacturing process used to form product 112. Safety data sheets 312 may be obtained from, for example, without limitation, at least one of chemical and materials system 216, environmental health system 222, occupational safety and health system 224, government reference 220, or regulatory organization 218.

Figure 4:
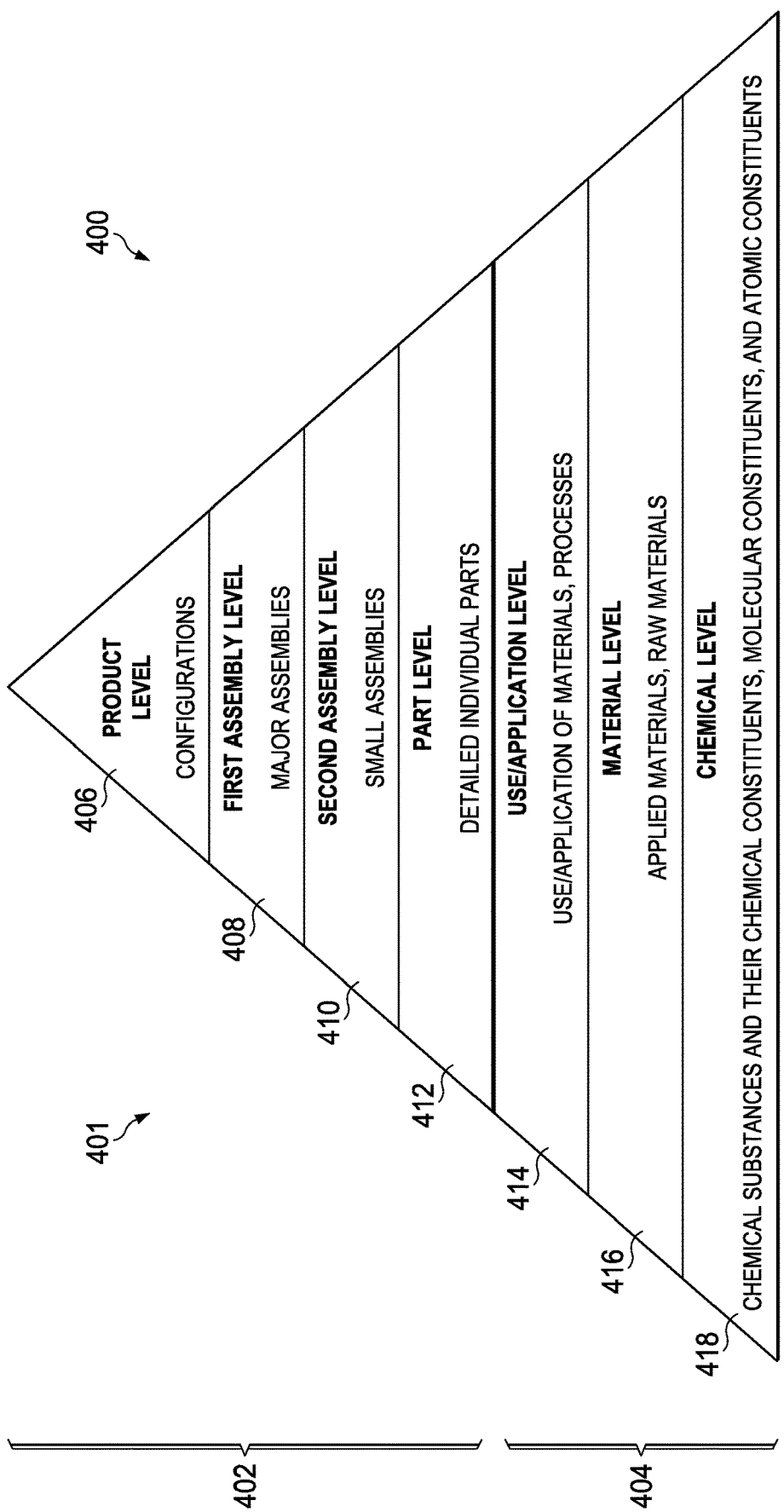
FIG. 4 is an illustration of a hierarchy of levels in accordance with an illustrative embodiment.

With reference now to FIG. 4, an illustration of a hierarchy of levels is depicted in accordance with an illustrative embodiment. In this illustrative example, hierarchy 400 may be comprised of plurality of levels 401, which may be an example of one implementation for plurality of levels 121 in FIG. 1. Although plurality of levels 401 is shown as being a plurality of hierarchical levels, in other illustrative examples, plurality of levels 121 in FIG. 1 may be implemented in some other manner.

As depicted, plurality of levels 401 includes upper levels 402 and lower levels 404. Upper levels 402 may include product level 406, first assembly level 408, second assembly level 410, and part level 412. Lower levels 404 may include use/application level 414, material level 416, and chemical level 418. In other illustrative examples, lower levels 404 may also include a regulation level (not shown).

Product level 406 may be the highest, or topmost, level in hierarchy 400. Product level 406 is the level for the various configurations for product 112. Processed product data corresponding to product level 406 may include, for example, without limitation, high-level data extracted from bill of materials data 300 in FIG. 3 relating to the product.

First assembly level 408 is the level for major assemblies that make up product 112. Processed product data corresponding to first assembly level 408 may include, for example, without limitation, data extracted from bill of materials data 300 in FIG. 3 about the major assemblies. Second assembly level 410 is the level for the various small assemblies that make up these major assemblies. Processed product data corresponding to second assembly level 410 may include, for example, without limitation, data extracted from bill of materials data 300 in FIG. 3 about the small assemblies. Part level 412 is the level for the individual parts that make up these small assemblies. Processed product data corresponding to part level 412 may include, for example, without limitation, data extracted from bill of materials data 300 in FIG. 3 about individual parts. In some cases, processed product data corresponding to part level 412 may include data extracted from part notes 308, standard parts information 310, or both in FIG. 3.

Of course, depending on the implementation, part level 412 may also be the level for individual parts that are part of product 112 but not part of any small assembly or major assembly. Similarly, second assembly level 410 may also be for small assemblies that are part of product 112 but not part of any major assembly in product 112. Depending on the implementation, upper levels 402 may only include product level 406 and part level 412. For example, in some cases, product 112 may only be comprised of one or more parts and no assemblies.

Use/application level 414 is the level for the various uses and applications for materials that make up each part identified at part level 412 for product 112 and that are consumed during the manufacturing of product 112. Further, use/application level 414 may also be for the processes that use materials during the manufacturing of product 112.

Material level 416 is the level for the actual materials that make up each part identified at part level 412 for product 112 and that are consumed during the manufacturing of product 112. These materials may include, for example, applied materials and raw materials. Applied materials are materials that are topically applied to parts as, for example, finishes, coatings, and sealants. Raw materials are materials that are used to form parts. In other words, raw materials are the materials of which parts are composed. Processed product data corresponding to use/application level 414 and material level 416 may include, for example, without limitation, data extracted from at least one of material notes 320, finish code notes 324, process notes 322, or material safety data sheets 328 in FIG. 3.

Chemical level 418 is the lowest, or bottommost, level of hierarchy 400. Chemical level 418 is the level for the various chemical substances that make up the materials described above. A chemical substance may be either a chemical element or a chemical compound. A material may be comprised of a single chemical substance or a mixture of chemical substances, depending on the implementation. A chemical substance in a material may be referred to as a chemical constituent of that material.

A chemical substance may be broken down into its molecular constituents. The molecular constituents of a chemical substance are the types of molecules that make up that chemical substance. A molecular constituent may be further broken down into atomic constituents. The atomic constituents of a type of molecule are the atoms that make up that type of molecule.

In this manner, chemical level 418 may be the lowest level of detail possible for a particular part. Data identified for use/application level 414, material level 416, and chemical level 418 for a particular part may be used whenever that particular part is used in a product that may or may not be product 112. Processed product data corresponding to chemical level 418 may include, for example, without limitation, data extracted from at least one of material safety data sheets 328 in FIG. 3, product safety data sheets 326 in FIG. 3, or other types of information.

Figure 5:
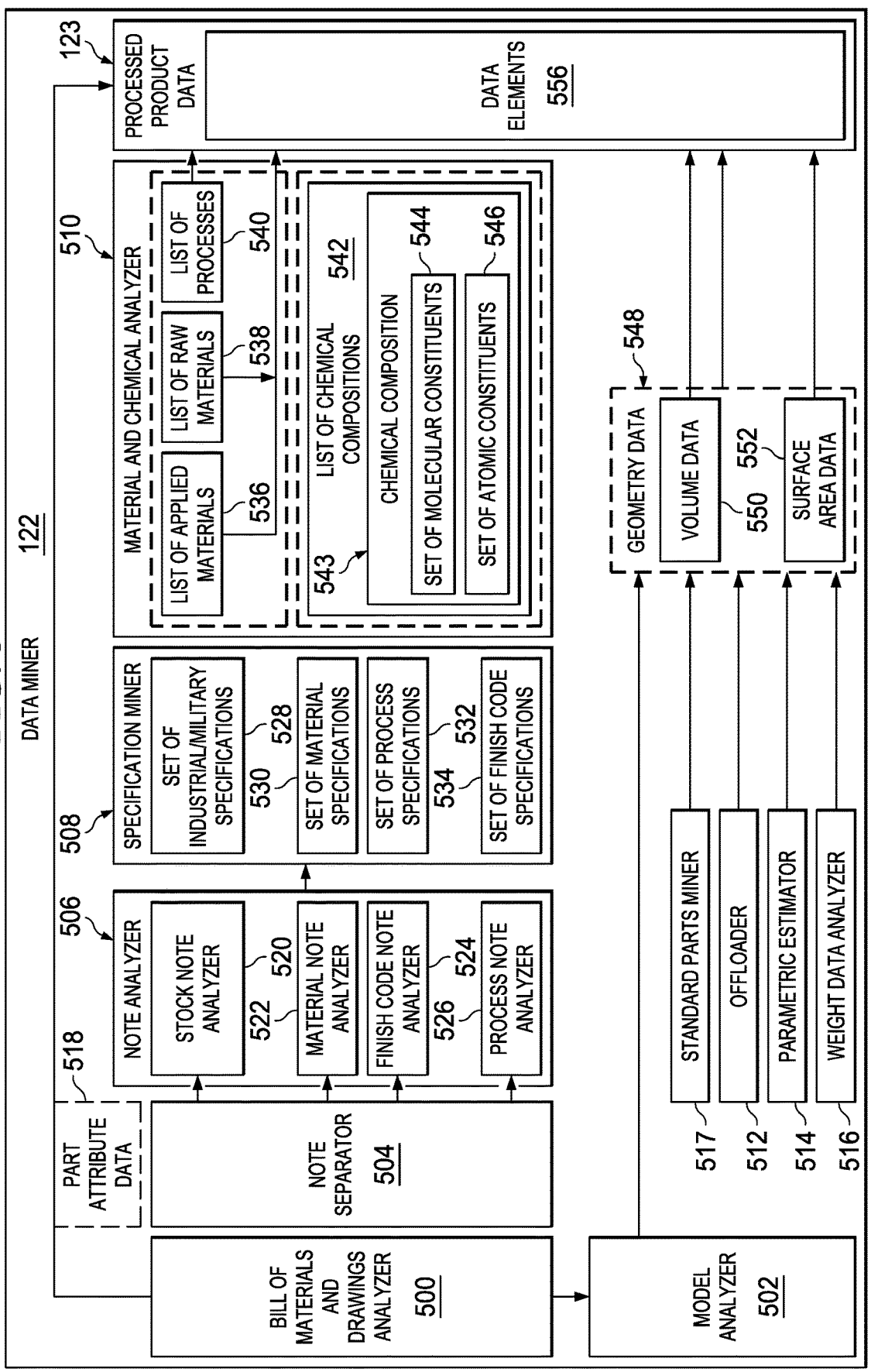
FIG. 5 is an illustration of an data miner in the form of a block diagram in accordance with an illustrative embodiment.

With reference now to FIG. 5, an illustration of data miner 122 from FIG. 1 is depicted in the form of a block diagram in accordance with an illustrative embodiment. In FIG. 5, an example of one implementation for data miner 122 from FIG. 1 is depicted. In one illustrative example, all of the operations performed by data miner 122 may be performed by a computer system. Data miner 122 may include bill of materials and drawing analyzer 500, model analyzer 502, note separator 504, note analyzer 506, specification miner 508, material and chemical analyzer 510, offloader 512, parametric estimator 514, weight data analyzer 516, and standard parts miner 517.

Bill of materials and drawing analyzer 500 is configured to receive and process bill of materials data and drawings. For example, bill of materials and drawing analyzer 500 may receive and process bill of materials data 300 and number of drawings 302 from FIG. 3 for product 112 in FIG. 1. Bill of materials and drawing analyzer 500 parses the data contained within bill of materials data 300 and number of drawings 302 and then formats this data according to selected format 124 from FIG. 1 as needed to form processed bill of materials data and processed drawing data. This processed data may form a portion of processed product data 123.

Bill of materials and drawing analyzer 500 uses the processed bill of materials data to identify data for individual parts identified at part level 412 in FIG. 4. For each part, bill of materials and drawing analyzer 500 identifies part attribute data 518 and part notes 308 in FIG. 3. Part attribute data 518 may form a portion of processed product data 123.

For a particular part, part attribute data 518 may include a value for each of a number of attributes for the part. The number of attributes for a particular part may include, for example, without limitation, at least one of a part number, a part name, a number of manufacturers of the part, a number of drawing identifiers, or some other attribute for the part. The number of drawing identifiers may identify a number of drawings of the particular part.

Note separator 504 receives part notes 308. Note separator 504 may separate part notes 308 into the different types of notes. For example, part notes 308 may be separated into stock notes 318, material notes 320, process notes 322, and finish code notes 324, in FIG. 3, for a particular part.

Note analyzer 506 then receives these notes that are separated by type and analyzes these notes. As depicted, note analyzer 506 may include stock note analyzer 520, material note analyzer 522, finish code note analyzer 524, and process note analyzer 526, which are configured to analyze stock notes 244, material notes 246, finish code notes 248, and process notes 250 in FIG. 2, respectively.

Prior to analyzing the notes, each of the analyzers in note analyzer 506 determines whether the corresponding notes are in the selected format. If the notes are not in the selected format, the notes may need to be first parsed prior to the notes being analyzed for the desired data. For example, when the notes are in free-form text, the free-form text may need to be parsed in order to extract the desired data from the notes.

Stock note analyzer 520 analyzes stock notes 318 to identify the individual dimensions for the different raw materials used to make the particular part. For example, stock note analyzer 520 may evaluate each character in stock notes 318 for a particular part to detect the presence of values of interest. Values of interest may include numerical values and in some cases, other types of values. Each value of interest is extracted and analyzed to determine a type for the numerical value. The type may be, for example, width, height, length, depth, diameter, thickness, a cross-sectional data value, a part shape, or some other type.

Material note analyzer 522 analyzes material notes 320 to identify the materials used on the particular part by name, material specifications corresponding to these materials, and other types of data about the materials. In particular, material note analyzer 522 evaluates each character and word in material notes 320 to detect data of interest. The data of interest may include, for example, at least one of a list of materials used on the part or a list of material specifications referenced in material notes 320. The data of interest is then parsed and output to a template. Material note analyzer 522 is configured to compensate for all variations in material names and specification names, as well as other types of variations.

Finish code note analyzer 524 analyzes finish code notes 324 to identify the applied materials used in the manufacturing of the part and the methods by which the applied materials are used. Finish code note analyzer 524 evaluates each character and word to detect data of interest. The data of interest may include, for example, at least one of a list of the applied materials for the part, a list of application methods, or a list of finish codes referenced in finish code notes 324. This data of interest may be parsed and then output to a template. Finish code note analyzer 524 is configured to compensate for all variations in material names and specification names, as well as other types of variations.

Process note analyzer 526 analyzes process notes 322 to identify the specific processes used to manufacture or build the particular part. Process note analyzer 526 evaluates each character and word for data of interest. The data of interest may include, for example, at least one of a list of the processes used to manufacture the part or a list of process specifications referenced in process notes 322. This data of interest may be parsed and then output to a template. Process note analyzer 526 is configured to compensate for all variations in process names and specification names, as well as other types of variations.

In this illustrative example, specification miner 508 is configured to receive the data of interest identified and output by note analyzer 506. Based on the data of interest, specification miner 508 identifies different specifications of interest. These specifications may include, for example, set of industrial/military specifications 528, set of material specifications 530, set of process specifications 532, and set of finish code specifications 534. As used herein, a "set of" items means one or more items. For example, set of material specifications 530 may include one or more specifications.

In this manner, set of industrial/military specifications 528 may be identified based on the output of material note analyzer 522 and process note analyzer 526. Specification miner 508 then searches for and parses the information in set of industrial/military specifications 528 to extract data of interest.

Set of material specifications 530 may be identified based on the output of material note analyzer 522, finish code note analyzer 524, and process note analyzer 526. Specification miner 508 searches for and parses the information in set of material specifications 530 to extract data of interest.

Set of process specifications 532 may be identified based on the output of material note analyzer 522, finish code note analyzer 524, and process note analyzer 526. Specification miner 508 searches for and parses the information in set of process specifications 532 to extract data of interest. In some cases, a process specification may reference another process specification, one or more material specifications, finish codes, or a combination thereof.

Further, specification miner 508 may search set of process specifications 532 to identify set of finish code specifications 534. In this manner, set of finish code specifications 534 may be extracted from set of process specifications 532.

Specification miner 508 is configured to output the data extracted from the different specifications to material and chemical analyzer 510. The data sent to material and chemical analyzer 510 may include, for example, without limitation, list of applied materials 536, list of raw materials 538, and list of processes 540.

In some cases, material and chemical analyzer 510 may also receive at least a portion of safety data sheets 312 in FIG. 3. For example, material and chemical analyzer 510 may receive product safety data sheets 326 and material safety data sheets 328 in FIG. 3.

List of processes 540 may identify how each material identified in list of applied materials 536 and list of raw materials 538 are used in the manufacturing of the particular part. For example, a process in list of processes 540 may identify the thickness of material that is applied on the part, how the material is applied, the areas of the part onto which the material is applied, and other conditions for the application of the material onto the part.

Material and chemical analyzer 510 is configured to break down each material identified in list of applied materials 536 and list of raw materials 538 into the one or more chemical substances that make up that material. In other words, material and chemical analyzer 510 generates list of chemical compositions 542 for list of applied materials 536 and list of raw materials 538. Each chemical composition in list of chemical compositions 542 corresponds to a material in either list of applied materials 536 or list of raw materials 538. In some cases, material and chemical analyzer 510 may also use safety data sheets 312 from FIG. 3 to generate list of chemical compositions 542.

Chemical composition 543 is an example of one of the chemical compositions in list of chemical compositions 542. Chemical composition 543 identifies the one or more chemical substances that make up the corresponding material. In some illustrative examples, material and chemical analyzer 510 may be further configured to identify set of molecular constituents 544 for each chemical substance identified in chemical composition 543. Material and chemical analyzer 510 may be still further configured to break down each molecular constituent identified in set of molecular constituents 544 into set of atomic constituents 546.

In some illustrative examples, material and chemical analyzer 510 may also identify the chemical identifier associated with each material or chemical substance identified by material and chemical analyzer 510. The chemical identifier may be, for example, the Chemical Abstracts Service (CAS) Registry number of the material or chemical.

In this illustrative example, model analyzer 502 is configured to search for a solid three-dimensional computer model for the part based on the part number of the part identified by bill of materials and drawing analyzer 500 from bill of materials system 200 in FIG. 2. Model analyzer 502 is configured to compensate for variations in the naming conventions of solid three-dimensional computer models and parts when performing this search.

If a solid three-dimensional computer model is found, the data in the solid three-dimensional computer model is then analyzed to generate geometry data 548. Geometry data 548 may include volume data 550 and surface area data 552 for the part, as well as other data. Volume data 550 and surface area data 552 may be configured for use in chemical profiling.

If a solid three-dimensional computer model is not found for the part, at least one of offloader 512, parametric estimator 514, or weight data analyzer 516 is used to generate geometry data 548. Standard parts miner 417 is configured to search through, for example, standard parts information 236 in FIG. 2 to generate geometry data 548.

In some cases, offloader 512 is configured to send a list of parts that do not have any solid three-dimensional computer models to outside resources, including part vendors. Offloader 512 may request that these outside resources provide computer models, and in some cases, geometry data, for these parts. When geometry data is received, this geometry data may be used as geometry data 548. When computer models are received, model analyzer 502 may be used to analyze these computer models to generate geometry data 548.

Weight data analyzer 516 may be configured to analyze other types of data to generate geometry data 548. For example, weight data analyzer 516 may analyze weight data from weights system 208 in FIG. 2 and material density data. With weight data and material density data, volume data 550 can be calculated.

Figure 11:
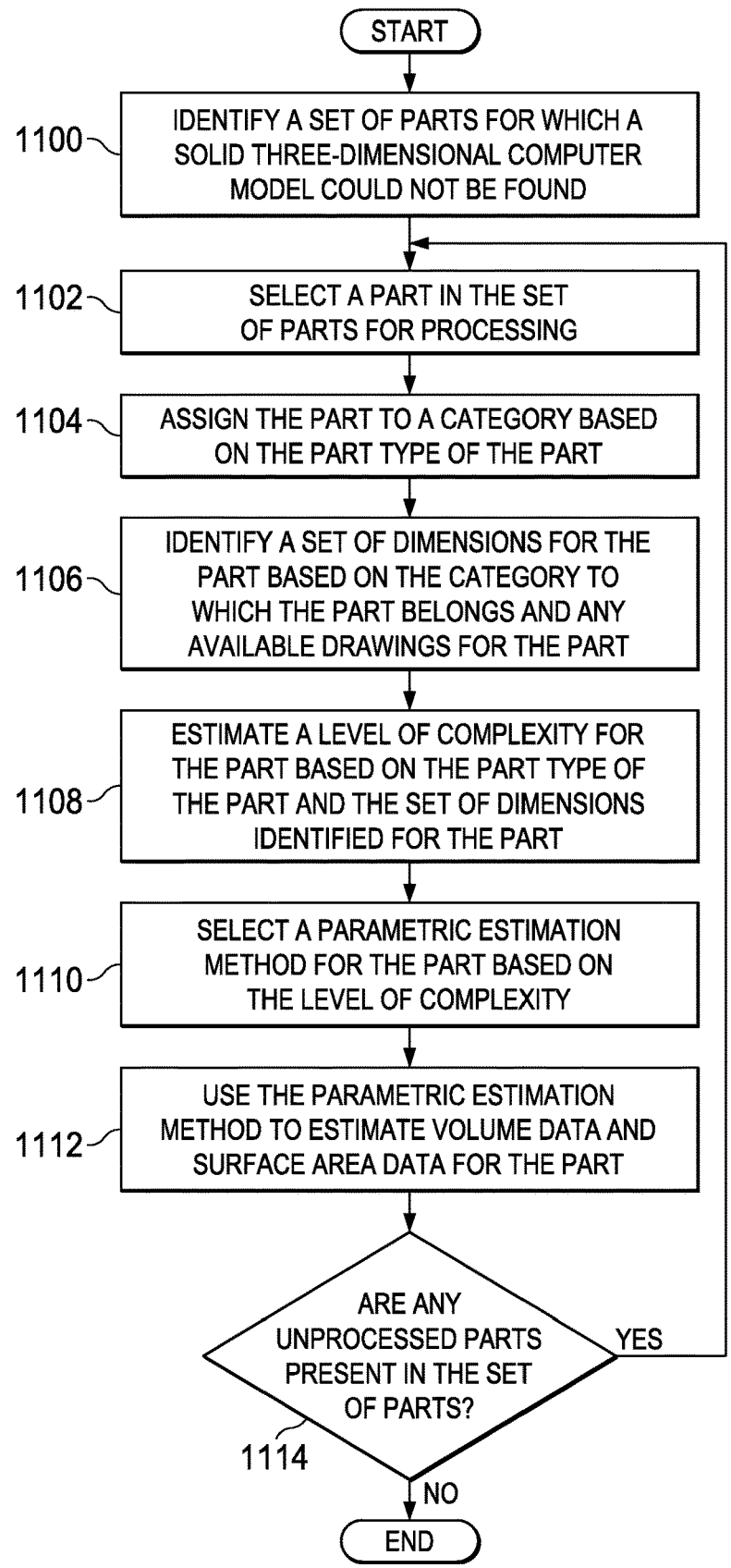
FIG. 11 is an illustration of a process for performing a parametric estimation in the form of a flowchart in accordance with an illustrative embodiment.

When geometry data 548 cannot be generated using weight data analyzer 516, parametric estimator 514, and offloader 512, parametric estimator 514 is configured to use parametric estimation to generate geometry data 548. A method for performing parametric estimation is depicted in FIG. 11, described below.

Figure 12A:
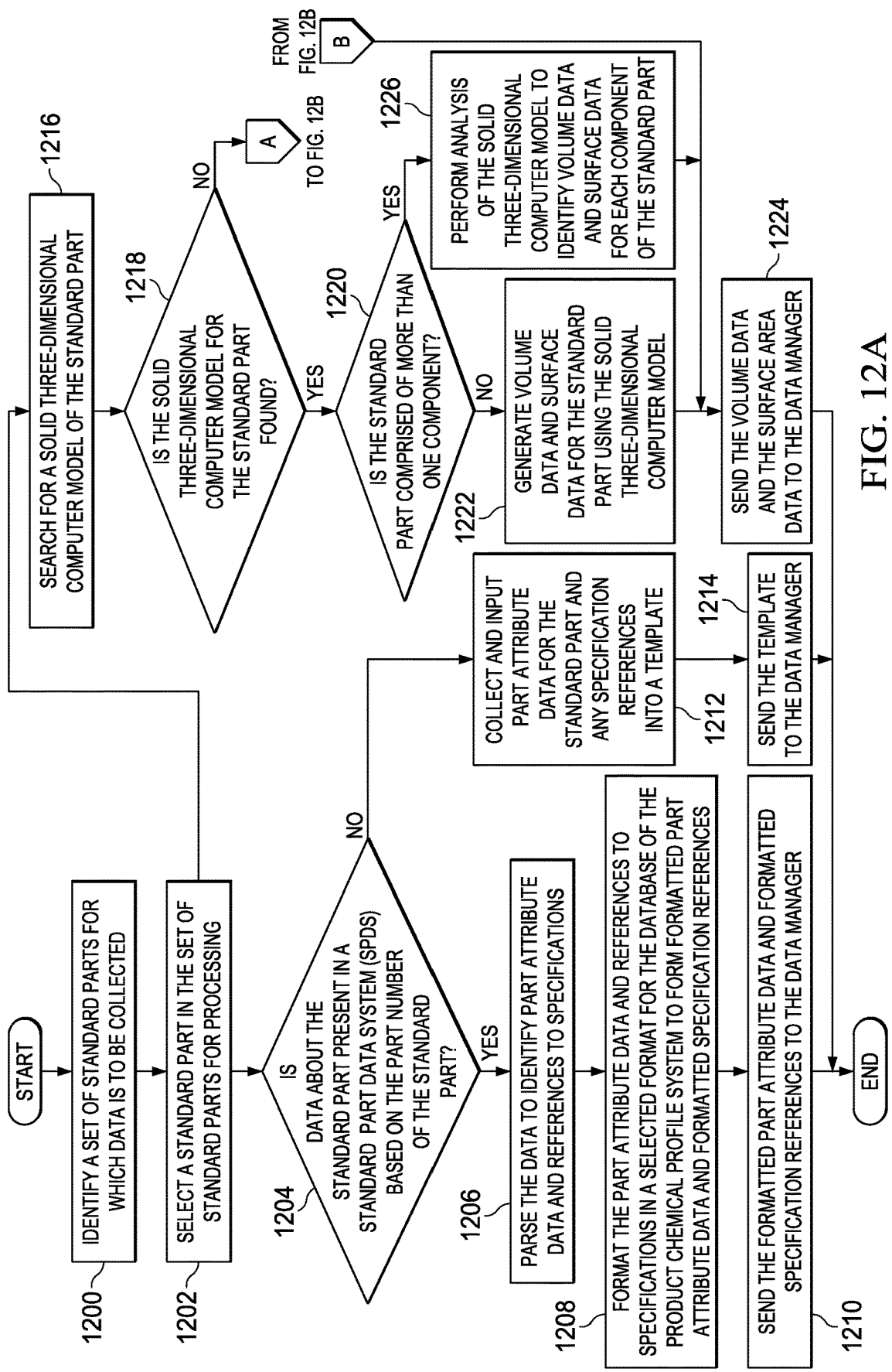
FIGS. 12A and 12B are illustrations of a standard parts information mining process in the form of a flowchart in accordance with an illustrative embodiment.
Figure 12B:
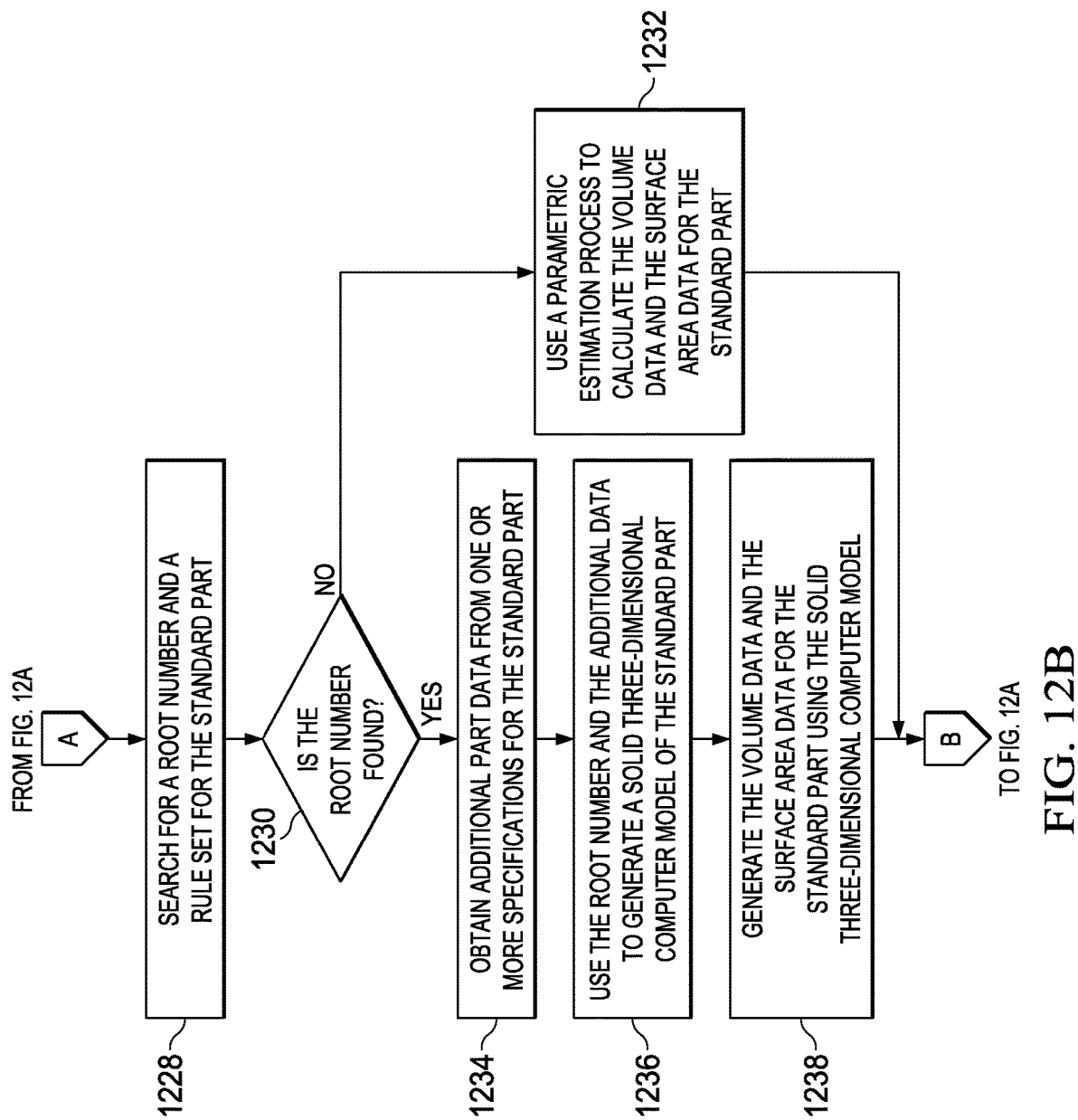

Standard parts miner 517 is configured to generate data for parts that may not be identified in bill of materials system 200. These may be standard parts that are used in different types of products. Further, these standard parts may be used in different types of industries. A method for performing a standard parts information process is depicted in FIGS. 12A and 12B, described below.

In this illustrative example, geometry data 548 and part attribute data 518 are used to form data elements for part level 412 in FIG. 4. List of processes 540 is used to form data elements for use/application level 414 in FIG. 4. List of applied materials 536 and list of raw materials 538 are used to form data elements for material level 416 in FIG. 4. List of chemical compositions 542 is used to form data elements for chemical level 418 in FIG. 4. All of these different data elements may form data elements 556 that may be sent to data manager 104 for addition to staging data store 107 in FIG. 1. Processed product data 123 stored in staging data store 107 in FIG. 1 may include data elements 556 for the various different levels.

Figure 6:
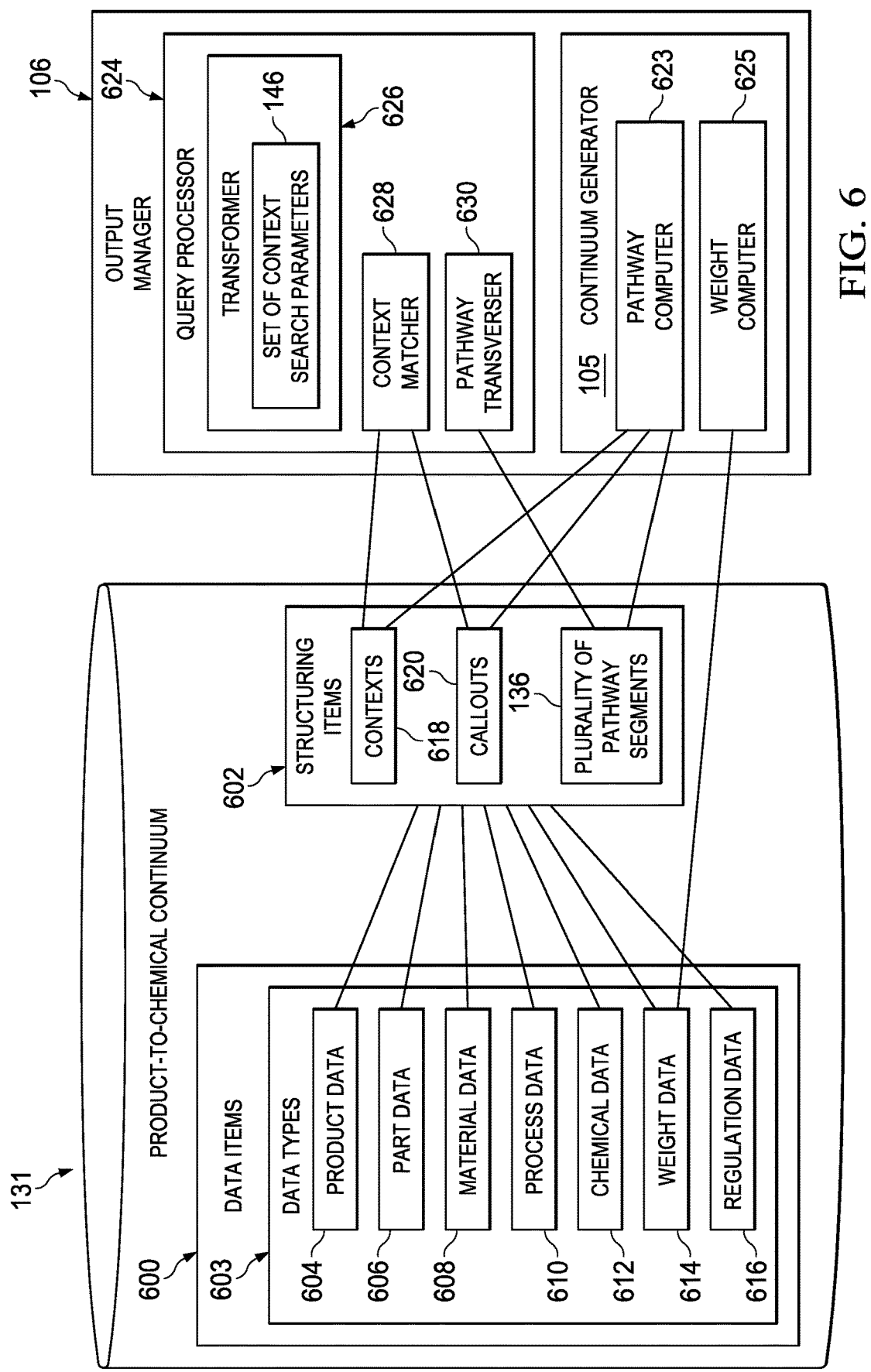
FIG. 6 is an illustration of a final data store, a continuum generator, and an output manager in accordance with an illustrative embodiment.

With reference now to FIG. 6, an illustration of one manner in which final data store 108, continuum generator 105, and output manager 106 from FIG. 1 may be implemented is depicted in accordance with an illustrative embodiment. As depicted, final data store 108 in FIG. 1 may include product-to-chemical continuum 131.

Product-to-chemical continuum 131 is comprised of data items 600 and structuring items 602. Data items 600 may be an example of one implementation for processed product data 123 in FIG. 1. Data items 600 may be of data types 603. In one illustrative example, each of data types 603 may correspond to one of plurality of levels 121 in FIG. 1. As one illustrative example, data types 603 may include product data 604, part data 606, material data 608, process data 610, chemical data 612, weight data 614, and regulation data 616 corresponding to a product level, a part level, a material level, a process level, a chemical level, a weight level, and a regulation level, respectively, in plurality of levels 121 in FIG. 1.

Structuring items 602 may include contexts 618, callouts 620, and plurality of pathway segments 136 from FIG. 1. Contexts 618 and callouts 620 may include the plurality of callouts 132 and plurality of contexts 134 identified for each of plurality of levels 121 of processed product data 123 in FIG. 1. In this manner, structuring items 602 may be formed in part by data manager 104 in FIG. 1 and in part by continuum generator 105 in FIG. 1.

Depending on the implementation, product-to-chemical continuum 131 may contain data items 600 for one product or multiple products. In other words, product-to-chemical continuum 131 may contain processed product data 123 for each of number of products 111 described in FIG. 1 above.

Further, plurality of pathway segments 136 in structuring items 602 may include pathway segments 136 that cross between data items for different products. As one illustrative example, a pathway segment may be created between a particular piece of information identified by a particular one of contexts 618 and each of a group of callouts within callouts 620 in which each of the group of callouts is located in a data item corresponding to a different product.

As a more specific example, one of contexts 618 may identify a piece of information about a chemical constituent used in a particular product. Plurality of pathway segments 136 may include a callout-context pathway segment that links one of callouts 120 in a data item related to the particular product at a higher level than the context to the context. However, plurality of pathway segments 136 may also include callout-context pathway segments that link callouts in data items related to all other products that also reference that same piece of information related to the chemical constituent. Consequently, requests for information about the use of that chemical constituent in all the other products may be easily and quickly obtained. In this manner, pathway segments may span data items across multiple products.

In some cases, at least one of product-to-chemical continuum 131 or final data store 108 may be created via a neutral data model which can represent pathway segments constructed from explicit and inferred linkages between pieces of data within data items 600. In one illustrative example, data types 603 may be identified by defining the following at any point in the continuum: parts, processes, materials, chemicals, explicit effectiveness, implied effectiveness, classification schemes, options, defaults, supersession rules, and dependencies.

Explicit effectiveness may also be referred to as explicit effectivity. Implied effectiveness may also be referred to as implied effectivity. Explicit effectiveness may include directly specifying applicability of an item such as, for example without limitation, the applicability of a part on an airplane, a material on a part, or some other type of item with respect to a more complex item. Implied effectiveness may include using contexts, which include custom classification schemes to infer applicability based on matching rules.

Classification schemes can be defined for each item, such as, for example, without limitation, a material specification. Options may include options for processes, materials, groupings, or combinations or groupings of these. Defaults may include defaults for processes, materials, chemicals, or any combination thereof. Supersession rules may include, for example, without limitation, rules for replacing parts, materials, processes, chemicals, or some combination thereof. Dependencies may include, for example, without limitation, dependencies between processes, materials, and chemicals.

In one illustrative example, processed product data 123 may be organized and sorted into data types 603, which may correspond to plurality of levels 121 in FIG. 1. In other illustrative examples, continuum generator 105 may organize and sort processed product data 123 in staging data store 107 in FIG. 1 into data types 603. Continuum generator 105 may then generate at least a portion of plurality of pathway segments 136 using data types 603 and structuring items 602.

Each of contexts 618 and each of callouts 620 may contain a set of attribute-value pairs. In some cases, the set of attribute-value pairs may contain zero attribute-value pairs. When the set is empty, the context may be referred to as an empty context.

Each attribute-value pair comprises an attribute and a value for that attribute. For example, without limitation, "Category A" may be an attribute-value pair in which "Category" is the attribute and "A" is the value for that attribute. In one illustrative example, each of contexts 618 may have a unique set of attribute-value pairs.

An attribute may represent one or more classification schemes, contextual information, or some combination thereof. A classification scheme may be used by, for example, technical documentation to specify applicability of content. For example, a material specification may specify type, glass, and grade. The contextual information may be needed to disambiguate reference to documentation. For example, one may need to know the operating temperature of a part to select appropriate options within a process specification.

The set of attribute-value pairs for each of callouts 620 may define a reference that may point to some portion of data within a data item within data items 600. At least a portion of the set of attribute-value pairs for each of callouts 620 may be matched against a particular context in contexts 618. For example, the reference made by a callout may include, for example, an attribute-value pair that identifies a particular process specification. The rest of the set of attribute-value pairs for the callout may further refine the reference by specifying a particular method within that process specification, a specified class, a specified operating temperature or temperature range, or some other specific information.

In one illustrative example, each callout may be considered as having two components: (1) an item attribute-value pair that points to a particular data item in data items 600 and (2) additional information in the form of zero or more attribute-value pairs. When the additional information is present, the additional information refines the reference made by the callout.

If a callout has an item attribute-value pair without additional information that can unambiguously be matched to an empty context, the callout defines an explicit effectivity. If a match requires a non-empty context, the callout defines an implicit effectivity.

Continuum generator 105 may be configured to match callouts 620 to contexts 618 and, in some cases, contexts 618 to callouts 620. A callout matches a context when all attribute-value pairs in the callout match those in the context. Notably, the context may have additional attribute-value pairs which are not matched. The unmatched pairs may correspond to an ambiguous reference and may result in a matching of multiple contexts or multiple callouts. For example, multiple callouts may be matched to a particular context. Each match is treated as an option.

In one illustrative example, continuum generator 105 may include pathway computer 623 and weight computer 625. Pathway computer 623 may compute callout-context pathway segments 138 in FIG. 1 in plurality of pathway segments 136. A partial pathway may be formed when one or more of plurality of pathway segments 136 may be sequentially traversed.

In one illustrative example, a partial pathway may be computed as follows:
For each callout-i (not yet processed)
  For each matching context-j
    For each callout-k within scope of the context-j:
      Record partial pathway from callout-i to callout-k
    If there are no matches, record callout-i as a partial
      pathway of length 1.

A callout within the scope of a context may be an embedded callout that is embedded with the portion of data in the data item identified by that context. Using the above algorithm, pathway computer 623 may build a complete set of unique pathways by joining partial pathways so that there is a pathway for each callout and that each pathway has a maximal length.

In some cases, the recording step performed above to record the partial pathway from callout-i to callout-k may be performed by recording the pathway segment from callout-i to context-j and then the pathway segment from context-j to callout-k. In other illustrative examples, the partial pathway may be recorded as a pathway segment directly from callout-i to callout-k.

Continuum generator 105 may be configured to handle callout dependencies and options within a context. There may be multiple callouts defined within the scope of a context. These callouts may be designated as co-dependent, meaning that they must be considered together. For example, a process may require both a paint and a thinner. If there are multiple sets of dependencies, each set is considered as an option.

When designating the type of callouts defined within a context, continuum generator 105 may define different types of callouts within a context. This type of information is used to annotate the pathways. Examples of types include elaboration, supersession, and substitution.

With elaboration, the context defines additional callouts that must be considered when creating pathways. For example, the definition of a part/process/material calls out sub-component/process/material. With supersession, the original callout is replaced with another in the given context. With substitution, the original callout is allowed to be substituted by another within the given context.

In one illustrative example, output manager 106 may include, for example, query processor 624. Query processor 624 may be used to query final data store 108 based on a received query request for desired information related to product 112 in FIG. 1. Query processor 624 may include transformer 626, context matcher 628, and pathway transverser 630. Transformer 626 may transform the received query request into a pathway search. For example, transformer 626 may transform the query request into set of context search parameters 146. Context matcher 628 may be used to match set of context search parameters 146 to contexts within product-to-chemical continuum 131. In this illustrative example, output manager 106 may include pathway transverser 630 configured to interact with product-to-chemical continuum 131 and traverse any number of pathway segments in plurality of pathway segments 136 based on set of context search parameters 146 to extract desired information related to product 112 from product-to-chemical continuum 131 in final data store 108.

Final data store 108 and product-to-chemical continuum 131 stored in final data store 108 may enable plurality of different sources 113 in FIG. 1 to change over time. The open-ended and flexible nature of the data model used to form final data store 108 may accommodate any convention or scheme for breaking down parts into components, materials, chemical substances, and their elements. This may be critical because of the high degree of variation across source systems, different conceptualizations and conventions used in underlying subject domains (e.g. structure composite part design versus that of carpeting material), different classification schemes used in individual specifications (e.g. material, process, or part standard), and the historical range of conventions used (e.g., 2-D drawings vs. 3-D model-based definition).

Final data store 108 may enable plurality of different sources 113 in FIG. 1 to be used in computing chemical profiles. However, the different types of data may not be explicitly linked together in the source systems from which the original information is retrieved. Instead, there are context and matching rules which must be applied. With product-to-chemical continuum 131, plurality of pathway segments 136 may allow this information to remain independent but linkable through plurality of pathway segments 136. For example, a product design may invoke a process specification, which may define multiple processing methods, but only one of which applies to the product design. Matching the right method to the product design may depend on the various implicit and explicit contextual data within product-to-chemical continuum 131.

Query processor 624 may be used to obtain information related to multiple products. For example, query processor 624 may be used to perform a search for all products having a particular regulated chemical, are manufactured using the particular regulated chemical, or both. In another illustrative example, query processor 624 may perform a search for all parts in a particular inventory having a particular regulated chemical, are manufactured using the particular regulated chemical, or both. In yet another illustrative example, query processor 624 may perform a search for all material specifications that refer to a particular regulated chemical.

Consequently, any number of different types of queries may be performed using query processor 624 and product-to-chemical continuum 131. Plurality of pathway segments 136 may be bi-directional and any number of partial pathway searches may be supported. Plurality of pathway segments 131 and having all of data items 600 and structuring items 602 within a single data repository may reduce the processing resources and time needed by a computer system to quickly and easily identify chemical information multiple products.

The illustration of data management environment 100 in FIG. 1, plurality of different sources 113 in FIGS. 1 and 2, information 110 in FIGS. 1 and 3, hierarchy 400 in FIG. 4, data miner 122 in FIGS. 1 and 5, and product-to-chemical continuum 131, continuum generator 105, and output manager 106 in FIG. 6 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

In some illustrative examples, data miner 122 may be considered separate from product chemical profile system 101. For example, data miner 122 may be configured to run on a computer system in a location remote to computer system 102. In this example, data, such as processed product data 123 may be sent from data miner 122 to data manager 104 over a number of wired or wireless communications links.

Although plurality of levels 121 of processed product data 123 are described as being stored in staging data store 107, in some cases, plurality of levels 121 of processed product data 123 may be stored in associative memory. Of course, in other illustrative example, some other type of data structure or type of memory may be used to store processed product data 123.

In some illustrative examples, data manager 104, continuum generator 105, or both may be configured to create alerts indicating the possible presence of gaps in information or errors in processed product data 123. For example, without limitation, as data miner 122 performs the processing of information 110 to generate processed product data 123, data miner 122 may encounter a portion of data that data miner 122 is unable to process correctly. Data miner 122 may create an alert, an error indication, a log in a file, or some other type of error output indicating that this portion of data was unable to be processed. This type of output may be later added to and stored as part of product-to-chemical continuum 131.

In some cases, data miner 122 may generate an image with optical character recognition capabilities that indicates that there is a gap in data, a potential error, or some other type of issue with the data. This image may be later added to and stored as part of product-to-chemical continuum 131.

In other illustrative examples, continuum generator 105 may be configured to track errors in the generation of plurality of pathway segments 136. For example, without limitation, as continuum generator 105 creates plurality of pathway segments 136, continuum generator 105 may create an alert for any potential gap or error in the generation of plurality of pathway segments 136. These alerts may be stored in product-to-chemical continuum 131.

In this manner, alerts, error messages, and other types of error outputs may be created by data manager 104, continuum generator 105, or both without any significant time delays or interruptions to the overall creation of product-to-chemical continuum 131. At some later point in time, a human operator may then be able to review the various alerts and error outputs that have been created and address them accordingly. In this manner, the efficiency with which information 110 is processed to create processed product data 123 and with which product-to-chemical continuum 131 is created may be significantly increased using data miner 122. For example, without limitation, as data miner 122 performs the processing of information 110 to generate processed product data 123, data miner 122 may create an alert requesting user input from a human operator when data miner 122 is unable to process a particular piece of information 110.

In one illustrative example, data miner 122 may receive an electronic image capturing a paper document with handwritten notes. Data miner 122 may be unable to read and process these handwritten notes. Data miner 122 may then create an alert requesting that a human operator enter user input to aid in the processing of the electronic image. In some cases, data miner 122 may generate an error file during the processing of information 110 that identifies all pieces of information 110 that require further review by a human operator or user input by a human operator in order to process.

In this manner, the efficiency with which information 110 is processed may be significantly increased using data miner 122. A human operator may not need to spend the time and effort needed to sort and interpret different portions of information 110 until prompted or alerted by data miner 122.

Figure 7:
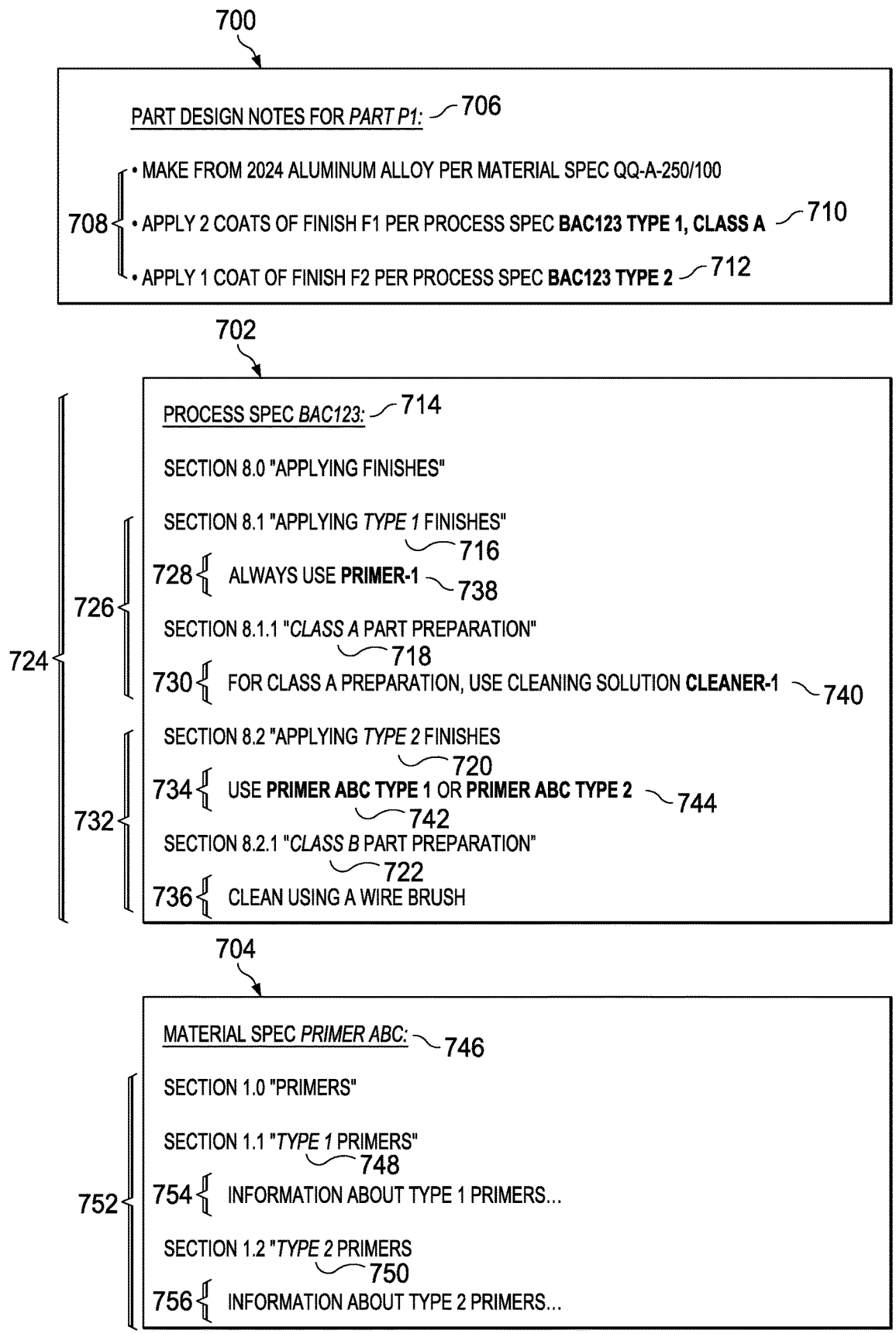
FIG. 7 is an illustration of callouts and contexts in accordance with an illustrative embodiment.

With reference now to FIG. 7, an illustration of callouts and contexts is depicted in accordance with an illustrative embodiment. In this illustrative example, callouts and contexts are presents within part design notes 700, process specification 702, and material specification 704.

In this illustrative example, context 706 has been identified within part design notes 700. Context 706 contains a single attribute-value pair in this example. Context 706 identifies portion 708 of data within part design notes 700 as corresponding to "Part P1."

Callout 710 and callout 712 are embedded callouts corresponding to context 706. Callout 710 includes three attribute-value pairs, while callout 712 includes two attribute-value pairs. Each of callout 710 and callout 712 is a reference to a portion of data within the process specification pointed to by the corresponding callout.

In this illustrative example, attribute-value pairs 714, 716, 718, 720, and 722 have been identified within process specification 702. Attribute-value pair 714 may form one context that identifies portion 724 of data within process specification 702. Together, attribute-value pair 714 and attribute-value pair 716 form another context that identifies portion 726. Sub-portion 728 within portion 726 may be required but sub-portion 730 within portion 726 may be an option. Attribute-value pair 714, attribute-value pair 716, and attribute-value pair 718 together form another context that identifies portion 726 in which both sub-portion 728 and sub-portion 730 are required.

Similarly, attribute-value pair 714 and attribute-value pair 720 identify portion 732 in which sub-portion 734 is required and sub-portion 736 is an option. Attribute-value pair 714, attribute-value pair 720, and attribute-value pair 722 identify portion 734 in which both sub-portions are required.

Callout 738 is embedded within sub-portion 728 of data. Callout 740 is embedded within sub-portion 730 of data. Callout 742 and callout 744 are both embedded within sub-portion 734 of data. Callout 742 and callout 744 may represent two options. Thus, once portion 734 of data has been reached, two options may be further explored.

Callout 710 in part design notes 700 may be matched to the context formed by attribute-value pair 714, attribute-value pair 716, and attribute-value pair 718. Callout 712 in part design notes 700 may be matched to the context formed by attribute-value pair 714 and attribute-value pair 720.

Attribute-value pair 746, attribute-value pair 748, and attribute-value pair 750 are present within material specification 704. Attribute-value pair 746 identifies portion 752 of data within material specification 704. Attribute-value pair 746 and attribute-value pair 748 identify portion 754 of data. Attribute-value pair 746 and attribute-value pair 750 identify portion 756 of data. In this illustrative example, no callouts are embedded within portion 754 or portion 756.

Callout 742 in process specification 702 may be matched to the context formed by attribute-value pair 746 and attribute-value pair 748. Callout 744 in process specification 702 may be matched to the context formed by attribute-value pair 746 and attribute-value pair 750. The callouts and contexts depicted in part design notes 700, process specification 702, and material specification 704 are only an example of one implementation for callouts and contexts.

Figure 8:
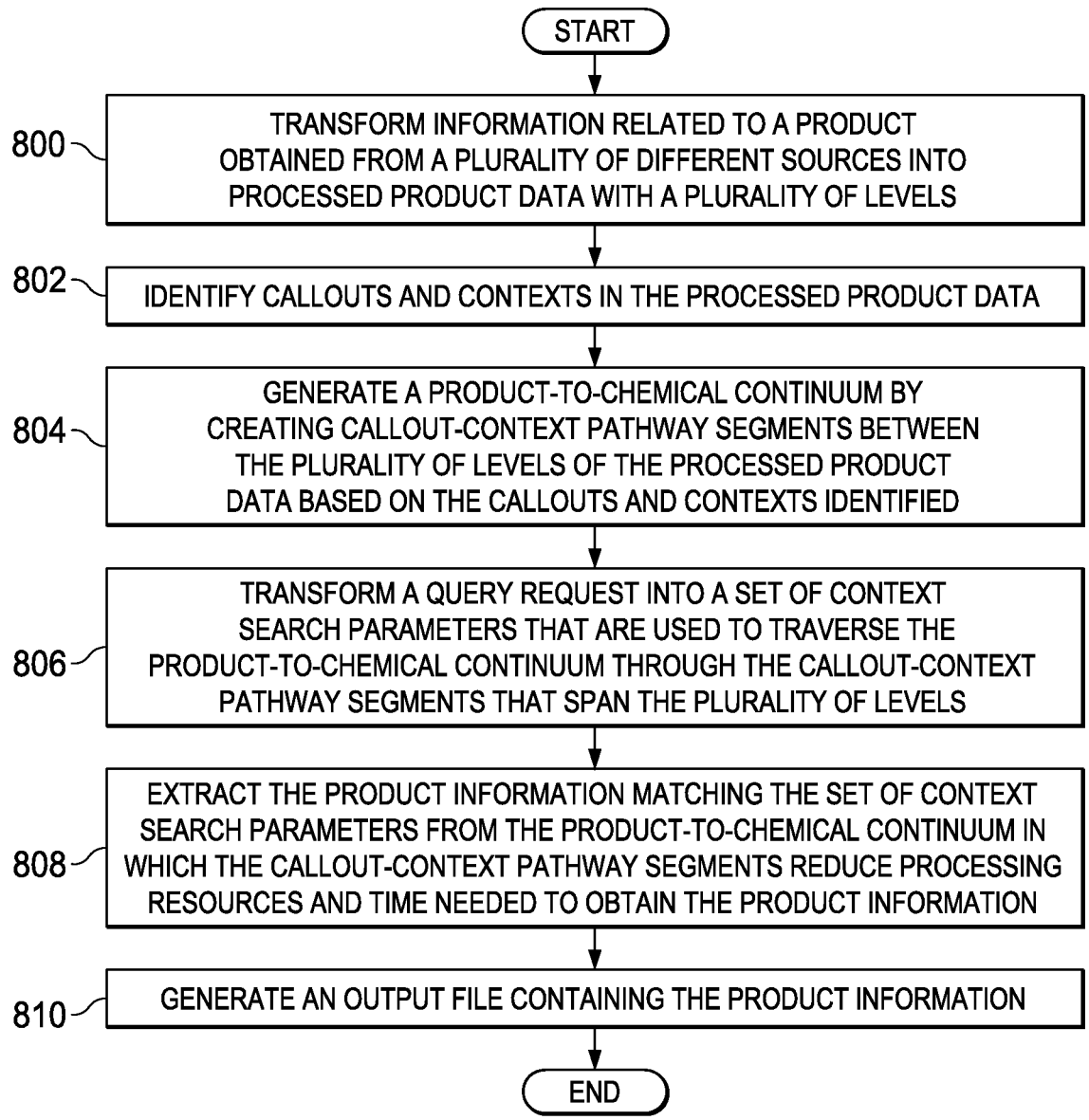
FIG. 8 is an illustration of a process for obtaining product related information in the form of a flowchart in accordance with an illustrative embodiment.

With reference now to FIG. 8, an illustration of a process for obtaining product related information is depicted in the form of a flowchart in accordance with an illustrative embodiment. The process illustrated in FIG. 8 may be implemented to generate a chemical profile for a product, such as chemical profile 156 for product 112 in FIG. 1.

The process begins by transforming information related to a product obtained from a plurality of different sources into processed product data with a plurality of levels (operation 800). Next, callouts and contexts are identified in the processed product data (operation 802). A product-to-chemical continuum is then generated by creating callout-context pathway segments between the plurality of levels of the processed product data based on the callouts and contexts identified (operation 804).

In response to receiving a query request for product information, the query request is transformed into a set of context search parameters that are used to traverse the product-to-chemical continuum through the callout-context pathway segments that span the plurality of levels (operation 806). The product information matching the set of context search parameters is extracted from the product-to-chemical continuum in which the callout-context pathway segments reduce processing resources and time needed to obtain the product information (operation 808).

An output file containing the product information is generated (operation 810), with the process terminating thereafter. The output file generated in operation 810 may be used to perform a number of operations related to at least one of design, manufacturing, certification, testing, or maintenance of the product using the output file. Traversing a pathway in the product-to-chemical continuum based on the set of context search parameters enables the output file to be generated with a speed and efficiency that thereby reduces an overall time and processing resources needed by an operator to perform the number of operations.

Figure 9:
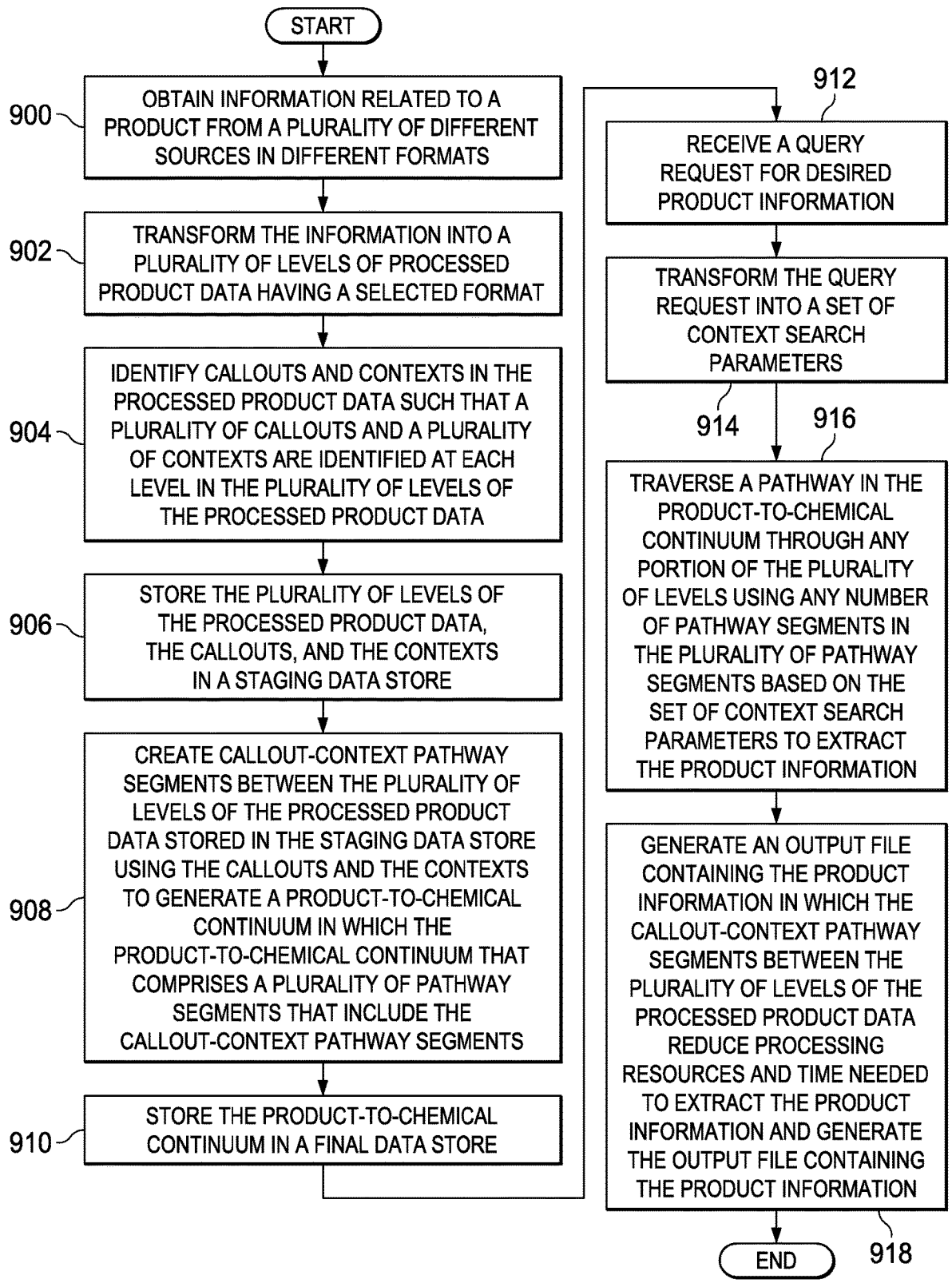
FIG. 9 is an illustration of a process for obtaining product related information in the form of a flowchart in accordance with an illustrative embodiment.

With reference now to FIG. 9, an illustration of a process for obtaining product related information is depicted in the form of a flowchart in accordance with an illustrative embodiment. The process illustrated in FIG. 9 may be implemented to obtain product related information that may include, for example, without limitation, a chemical profile for a product, such as chemical profile 156 for product 112 in FIG. 1. Product chemical profile system 101 in FIG. 1 may be used to obtain this product related information.

The process may begin by obtaining information related to a product from a plurality of different sources in different formats (operation 900). Next, the information is transformed into a plurality of levels of processed product data having a selected format (operation 902). Then, callouts and contexts are identified in the processed product data such that a plurality of callouts and a plurality of contexts are identified at each level in the plurality of levels of the processed product data (operation 904). The plurality of levels of processed product data, the callouts, and the contexts are stored in a staging data store (operation 906).

Thereafter, callout-context pathway segments are created between the plurality of levels of the processed product data stored in the staging data store using the callouts and the contexts to generate a product-to-chemical continuum in which the product-to-chemical continuum that comprises a plurality of pathway segments that include the callout-context pathway segments (operation 908). The product-to-chemical continuum is stored in a final data store (operation 910).

A query request for desired product information is then received (operation 912). The desired product information may include, for example, without limitation, information about one or more chemical constituents that make up the product, one or more assemblies in the product, one or more sub-assemblies in the product, one or more parts in the product, one or more materials used for the product, or some combination thereof. The information about the chemical constituents may include at least one of a weight, amount, cost, type of usage, or other information for each chemical constituent of interest.

As one illustrative example, a particular chemical may be declared environmentally unfriendly based on new environmental regulations. The query request may request a determination as to whether any of that chemical is used in the product or in the manufacturing of the product. The query request may also request a list of all parts, materials, and processes in which the chemical is used, a total weight of the chemical in the product, an overall cost of using the chemical, and other information. Without the product-to-chemical continuum stored in the final data store, obtaining this type of information may have been significantly time-consuming and labor-intensive. In some cases, obtaining this type of information accurately may not be readily possible without using product-to-chemical continuum. The information being requested in the query request may be used to identify suitable substitute chemicals that may reduce the overall environmental footprint of the product.

The query request is transformed into a set of context search parameters (operation 914). A pathway in the product-to-chemical continuum is traversed through any portion of the plurality of levels using any number of pathway segments in the plurality of pathway segments based on the set of context search parameters to extract the product information (operation 916). In particular, the set of context search parameters may be used to initiate traversal through the product-to-chemical continuum by identifying a first context-callout pathway segment and then continue traversal through the product-to-chemical continuum by alternating between callout-context pathway segments and context-callout pathway segments until all of the desired product information has been identified and extracted. In this manner, the desired product information may be quickly and easily identified within the product-to-chemical continuum by following the pathway segments in the product-to-chemical continuum according the set of context search parameters. An output file containing the product information is generated in which the callout-context pathway segments between the plurality of levels of the processed product data reduce processing resources and time needed to extract the product information and generate the output file containing the product information (operation 918), with the process terminating thereafter.

In this manner, traversal of a pathway in the product-to-chemical continuum comprised of callout-context pathway segments and context-callout pathway segments may improve the functioning of the computer system with respect to generating an output comprising the desired product information requested by the query request. Without the use of the pathway segments in the product-to-chemical continuum, obtaining and outputting the desired product information in response to a query request may be prohibitively expensive and time-consuming.

In particular, obtaining information about one or more chemical constituents that make up the product or that are used in the manufacturing of the product quickly and easily may not be possible without the use of the pathway segments of the product-to-chemical continuum. The final data store storing the product-to-chemical continuum may provide a single repository from which information about any chemical constituent making up the product or used in the manufacturing of the product may be identified and isolated.

In some cases, the product-to-chemical continuum may be used to obtain desired product related information with sufficient speed and ease such that the output file may be generated on-demand remotely. For example, the final data store storing the product-to-chemical continuum may be in a location remote from a manufacturing facility but may be accessible using wireless communications. A human operator at the manufacturing facility may need to identify information about a particular chemical being used in a particular manufacturing process related to the product. The product-to-chemical continuum allows this information to be quickly and readily obtained such that an output file may be generated and sent to a computer system at the manufacturing facility for same-day use by the human operator.

In one illustrative example, the output file generated in operation 918 may then be used to perform a design or manufacturing operation. For example, the output file generated in operation 918 may be performed to change the chemical composition of at least one part that makes up the product during manufacturing. The output file may include, for example, a chemical profile for a particular configuration of the product in which the chemical profile identifies a weight and amount of at least one chemical used in the particular configuration of the product. Based on this information, one or more suitable substitute chemicals may be identified to reduce the overall weight and cost of the product.

In another illustrative example, the output file may be used to improve the efficiency with which chemicals are ordered from various suppliers. In yet another example, the output file may identify all processes that involve the use of a particular chemical to ensure that all facilities at which those processes are performed meet corresponding chemical regulations. In some cases, the locations at which certain processes are performed may be changed to ensure that safety standards and regulations are met for the chemicals used in those processes.

Additionally, the product-to-chemical continuum created by the process described in FIG. 9 may be open-ended and flexible. In other words, new information may be easily incorporated into the product-to-chemical continuum. As the parts or materials used in a product change over time, the product-to-chemical continuum may be updated to reflect these changes.

In some cases, a report may be generated using the product-to-chemical continuum to determine how changing the used of one chemical in the product to another chemical may affect the overall weight of the product. For example, a report may be generated using product-to-chemical continuum to determine how replacing all cadmium within a product with some other type of chemical constituent would affect the overall weight of the product. In this manner, the design efficiency of the product may be greatly improved.

Figure 10A:
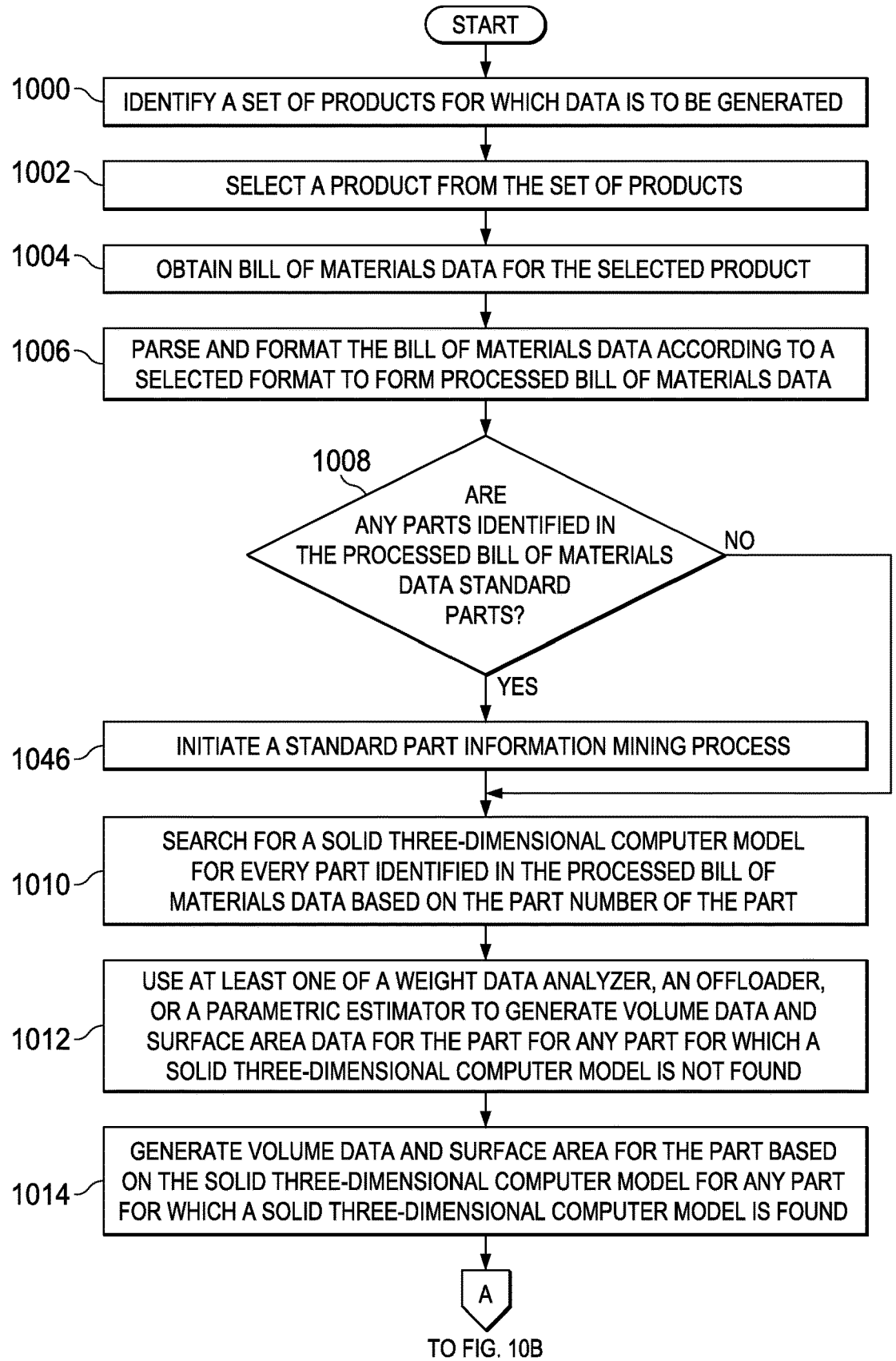
FIGS. 10A, 10B, and 10C are illustrations of a process for generating processed product data and data elements to be added to a database in the form of a flowchart in accordance with an illustrative embodiment.
Figure 10B:
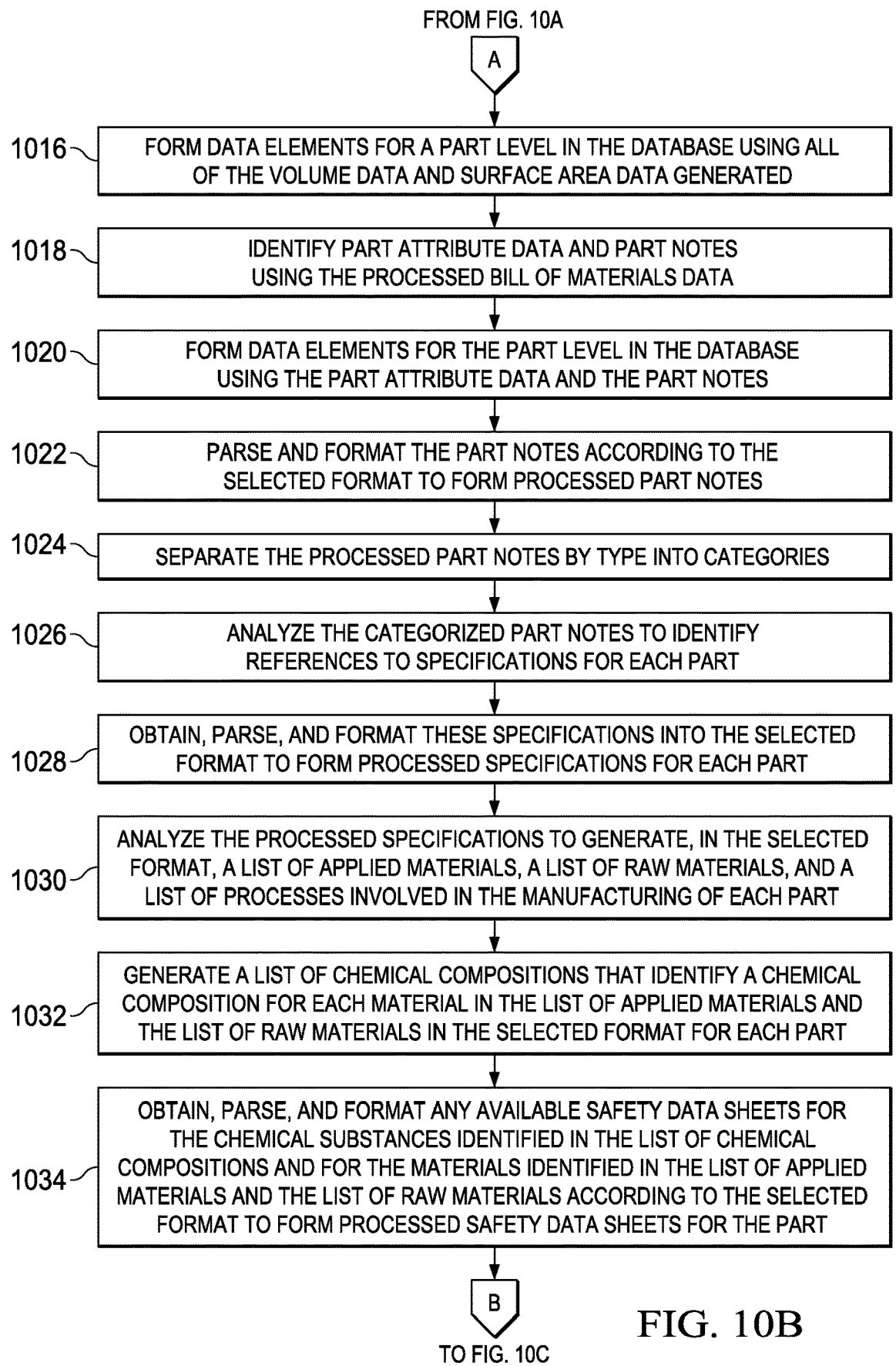
Figure 10C:
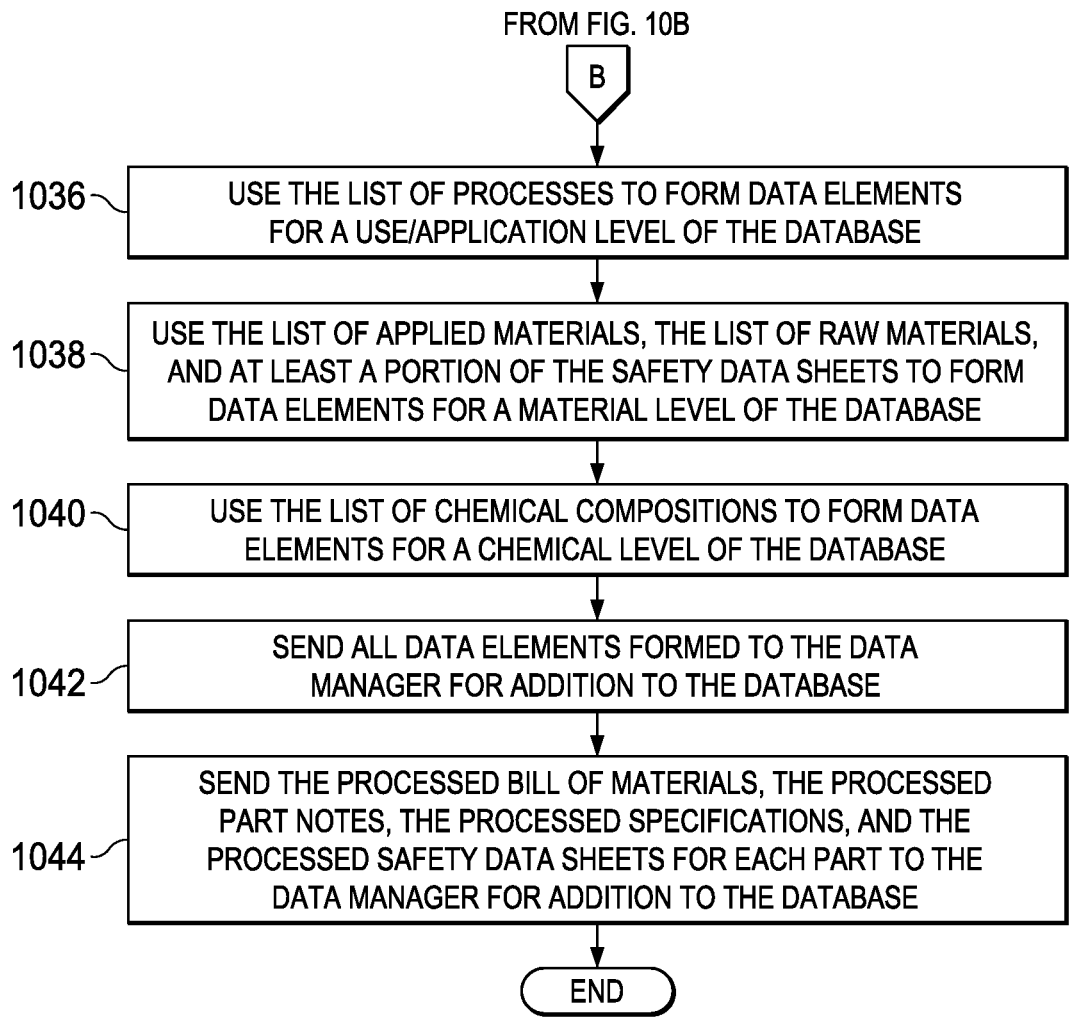

Turning now to FIGS. 10A, 10B, and 10C, illustrations of a process for generating processed product data and data elements to be added to a database are depicted in the form of a flowchart in accordance with an illustrative embodiment. The process illustrated in FIGS. 10A, 10B, and 10C may be performed using data miner 122 in FIGS. 1 and 5.

The process begins by identifying a set of products for which data is to be generated (operation 1000). A product is selected from the set of products (operation 1002). Next, a bill of materials data is obtained for the selected product (operation 1004). The bill of materials data is parsed and then formatted according to a selected format to form a processed bill of materials data (operation 1006). In operation 1006, the selected format may be the format used by the database in which the data is to be stored. This database may be an example of one implementation for staging data store 117 in FIG. 1.

Then, a determination is made as to whether any parts identified in the processed bill of materials data are standard parts (operation 1008). If no parts identified in the processed bill of materials data are standard parts, the process searches for a solid three-dimensional computer model for every part identified in the processed bill of materials data based on the part number of the part (operation 1010).

For any part for which a solid three-dimensional computer model is not found, at least one of a weight data analyzer, an offloader, or a parametric estimator is used to generate volume data and surface area data for the part (operation 1012). For any part for which a solid three-dimensional computer model is found, volume data and surface area for the part is generated based on the solid three-dimensional computer model (operation 1014).

Data elements for a part level in the database are formed using all of the volume data and surface area data generated (operation 1016). Thereafter, part attribute data and part notes may be identified using the processed bill of materials data (operation 1018).

In operation 1018, the part attribute data and part notes may be identified for every part identified in the processed bill of materials data. Further, in operation 1018, the part attribute data for a part may include, for example, but is not limited to, a part number, a part type, a manufacturer name, references to drawings of the part, actual drawings of the part, and other types of data. Data elements for the part level in the database are then formed using the part attribute data and the part notes (operation 1020).

Thereafter, the part notes are then parsed and formatted according to the selected format to form processed part notes (operation 1022). Next, the processed part notes may be separated by type into categories (operation 1024). These categories may include, for example, stock notes, material notes, process notes, and finish code notes. In other words, the processed part notes are categorized.

The categorized part notes may then be analyzed to identify references to specifications for each part (operation 1026). A specification may take the form of, for example, a material specification, a process specification, an industrial/military specification, or some other type of specification.

These specifications may then be obtained, parsed, and formatted into the selected format to form processed specifications for each part (operation 1028). The processed specifications are analyzed to generate, in the selected format, a list of applied materials, a list of raw materials, and a list of processes involved in the manufacturing of each part (operation 1030).

Next, a list of chemical compositions that identify a chemical composition for each material in the list of applied materials and list of raw materials is generated in the selected format for each part (operation 1032). Any available safety data sheets for the chemical substances identified in the list of chemical compositions and for the materials identified in the list of applied materials and the list of raw materials are then obtained, parsed, and formatted according to the selected format to form processed safety data sheets for the part (operation 1034).

The list of processes is used to form data elements for a use/application level of the database (operation 1036). The list of applied materials, the list of raw materials, and at least a portion of the safety data sheets are used to form data elements for a material level of the database (operation 1038).

The list of chemical compositions is then used to form data elements for a chemical level of the database (operation 1040). In operation 1040, a chemical composition of a material may be broken down into at least one of the one or more chemical substances that make up the material, the molecular constituents of each chemical substance identified, or the atomic constituents of each molecular constituent identified. By providing the chemical composition for a material, an individual chemical constituent within that material may be searched for and identified independently of the other chemical constituents that make up the material.

For example, the process may provide the technical effect of identifying a chemical constituent within the material that is restricted or prohibitively costly. This chemical constituent may be, for example, but is not limited to, cadmium, hexavalent chromium, or some other type of restricted-use chemical. Based on the list of chemical compositions generated in operation 1040, one or more suitable substitute chemical constituents may be identified that can replace the restricted or prohibitively expensive chemical constituent.

As chemical regulations, laws, and safety standards change over time, breakdown of chemical compositions may provide the capability to identify the weight, amount, type of usage, or other information for a particular chemical constituent across a product, an assembly in the product, a sub-assembly in the product, a part in the product, or a material in the product to ensure that the use of that particular chemical constituent meets the new chemical regulations, laws, and safety standards. For example, as Occupational Safety and Health Administration (OSHA) regulations change over time to restrict the use of a particular chemical constituent, all instances of use of that particular chemical constituent may be readily identified across the product based on the list of chemical compositions generated for the different materials used for the product.

All data elements and formed are then sent to the data manager for addition to the database (operation 1042). Further, the processed bill of materials, processed part notes, processed specifications, and processed safety data sheets for each part are sent to the data manager for addition to the database (operation 1044), with the process terminating thereafter. The processed bill of materials, processed part notes, processed specifications, and processed safety data sheets for each part in a product may together form processed product data for that product. With reference again to operation 1008, if any parts identified in the processed bill of materials data are standard parts, the process initiates a standard part information mining process (operation 1046), with the process then returning to operation 1010 as described above.

With reference now to FIG. 11, an illustration of a process for performing a parametric estimation is depicted in the form of a flowchart in accordance with an illustrative embodiment. The process illustrated in FIG. 11 may be used by parametric estimator 514 in FIG. 5 to perform a parametric estimation process. Further, this process may be used by the parametric estimator described in operation 1012 in FIG. 10A.

The process begins by identifying the set of parts for which a solid three-dimensional computer model could not be found (operation 1100). Operation 1100 may include identifying the part number for each part in the set of parts. Next, a part in the set of parts is selected for processing (operation 1102). The part is assigned to a category based on the part type of the part (operation 1104). The category may be selected from one of, for example, without limitation, a metallic category, a machined category, a sheet metal category, a composite category, and a tubing/ducting category.

Thereafter, a set of dimensions are identified for the part based on the category to which the part belongs and any available drawings for the part (operation 1106). A level of complexity is then estimated for the part based on the part type of the part and the set of dimensions identified for the part (operation 1108).

A parametric estimation method is selected for the part based on the level of complexity (operation 1110). The parametric estimation method is then used to estimate volume data and surface area data for the part (operation 1112).

A determination is then made as to whether any unprocessed parts are present in the set of parts (operation 1114). If any unprocessed parts are present, the process returns to operation 1102 described above. Otherwise, the process terminates.

With reference now to FIGS. 12A and 12B, illustrations of a standard parts information mining process are depicted in the form of a flowchart in accordance with an illustrative embodiment. The process illustrated in FIGS. 12A and 12B may be used by standard parts miner 417 in FIG. 4. Further, this process may be used to implement the standard parts information mining process described in operation 1044 in FIG. 10C.

The process begins by identifying a set of standard parts for which data is to be collected (operation 1200). A standard part in the set of standard parts is then selected for processing (operation 1202). Two processes are then initiated.

The first process initiated after operation 1202 begins by determining whether data about the standard part is present in a standard part data system (SPDS) based on the part number of the standard part (operation 1204). If data about the standard part is present in the standard part data system, the data is parsed to identify part attribute data and references to specifications (operation 1206).

The part attribute data and references to specifications are formatted in a selected format for the database of the product chemical profile system to form formatted part attribute data and formatted specification references (operation 1208). The formatted part attribute data and formatted specification references are then sent to the data manager (operation 1210), with the first process terminating thereafter.

With reference again to operation 1204, if data about the standard part is not present in the standard part data system, part attribute data for the standard part and any specification references are collected and input into a template (operation 1212). The template is then sent to the data manager (operation 1214), with the first process terminating thereafter.

The second process that is initiated after operation 1202 begins by searching for a solid three-dimensional computer model of the standard part (operation 1216). In operation 1216, different resources may be searched. For example, multiple model databases may be searched.

A determination is made as to whether the solid three-dimensional computer model for the standard part is found (operation 1218). If the solid three-dimensional computer model for the standard part is found, a determination is made as to whether the standard part is comprised of more than one component (operation 1220).

If the standard part is comprised of a single component, volume data and surface data for the standard part are generated using the solid three-dimensional computer model (operation 1222). The volume data and surface area data are then sent to the data manager (operation 1224), with the second process terminating thereafter. However, with reference again to operation 1220, if the standard part is comprised of multiple components, analysis of the solid three-dimensional computer model is performed to identify volume data and surface data for each component of the standard part (operation 1226), with the process then proceeding to operation 1224 described above.

With reference again to operation 1218, if the solid three-dimensional computer model for the standard part has not been found, the process searches for a root number and a rule set for the standard part (1228). The root number defines a basic shape of the standard part. The rule set may define unique parameters that dictate how the basic shape can be altered.

A determination is made as to whether the root number is found (operation 1230). If the root number is not found, a parametric estimation process is used to calculate volume data and surface area data for the standard part (operation 1232), with the process then proceeding to operation 1224 described above.

With reference again to operation 1230, if the root number is found, additional part data is obtained from one or more specifications for the standard part (operation 1234). The root number and the additional data are used to generate a solid three-dimensional computer model of the standard part (operation 1236). Volume data and surface area data for the standard part are then generated using the solid three-dimensional computer model (operation 1238), with the process then proceeding to operation 1224 described above.

Figure 13:
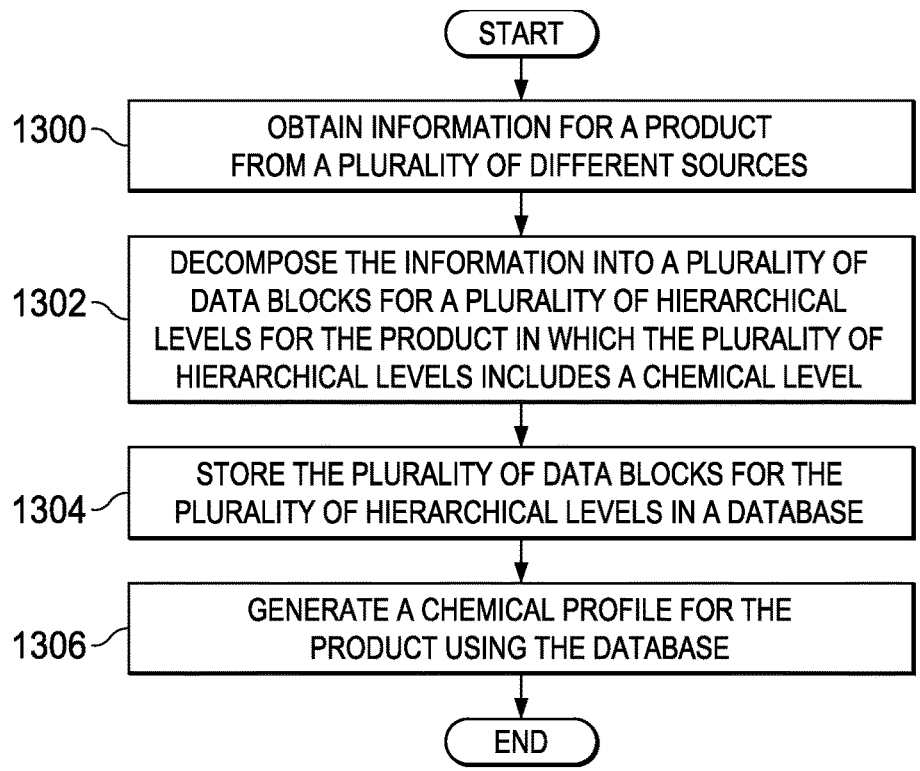
FIG. 13 is an illustration of a process for generating a chemical profile for a product in the form of a flowchart in accordance with an illustrative embodiment.

With reference now to FIG. 13, an illustration of a process for generating a chemical profile for a product is depicted in the form of a flowchart in accordance with an illustrative embodiment. The process illustrated in FIG. 13 may be implemented to generate a chemical profile for a product, such as chemical profile 156 for product 112 in FIG. 1.

The process begins by obtaining information for the product from a plurality of different sources (operation 1300). A source in the plurality of different sources has a different format compared to the information from at least one other source in the plurality of different sources. In this manner, at least two sources in plurality of different sources are different.

Next, the information is decomposed into a plurality of data blocks for a plurality of hierarchical levels for the product in which the plurality of hierarchical levels includes a chemical level (operation 1302). The plurality of hierarchical levels may be the levels into which the product may be broken down. The plurality of hierarchical levels may include, for example, in order of lowest level to highest level, a chemical level, a material level, a use/application level, and at least one of a part level, an assembly level, or a product level. The assembly level may be divided into a first assembly level and a second assembly level in some cases.

Thereafter, the plurality of data blocks for the plurality of hierarchical levels is stored in a database (operation 1304). In operation 1304, plurality of data blocks may be stored in the database such that a data block for a hierarchical level in plurality of hierarchical levels is managed independently with respect to other data blocks for other hierarchical levels in plurality of hierarchical levels.

Thereafter, a chemical profile for the product is generated using the database (operation 1306), with the process terminating thereafter. The chemical profile may identify, for example, a weight of a chemical used in a particular configuration of the product. Of course, in other illustrative examples, the chemical profile may identify the weights of multiple chemicals used in a particular configuration of the product.

Figure 14:
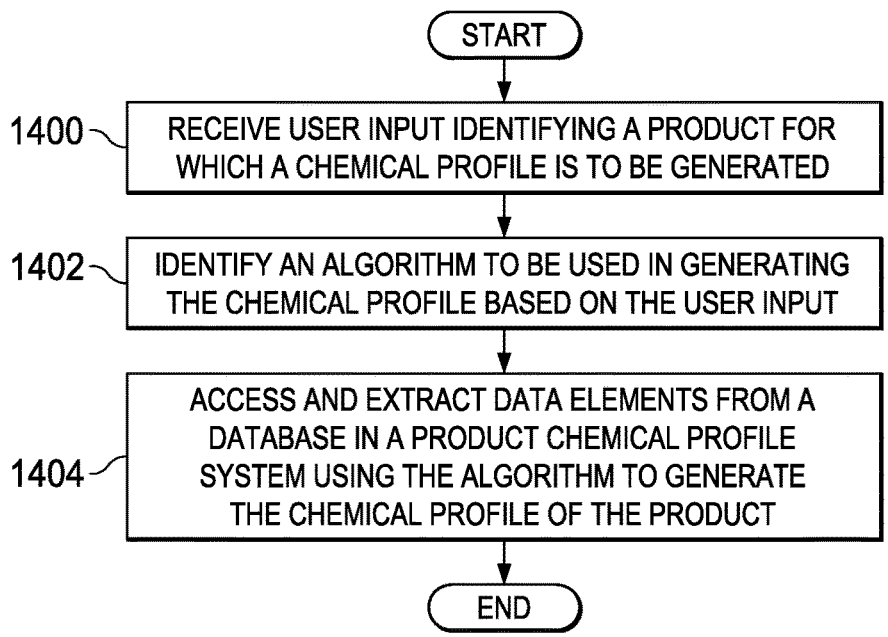
FIG. 14 is an illustration of a process for generating a chemical profile of a product in the form of a flowchart in accordance with an illustrative embodiment.

With reference now to FIG. 14, an illustration of a process for generating a chemical profile of a product is depicted in the form of a flowchart in accordance with an illustrative embodiment. The process illustrated in FIG. 14 may be implemented to generate, for example, chemical profile 156 in FIG. 1, using staging data store 107 in product chemical profile system 101 in FIG. 1.

The process begins by receiving user input identifying a product for which a chemical profile is to be generated (operation 1400). Next, an algorithm to be used in generating the chemical profile is identified based on the user input (operation 1402). Data elements are accessed and extracted from a database in a product chemical profile system using the algorithm to generate the chemical profile of the product (operation 1404), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, some of the operations performed in FIGS. 10A, 10B, and 10C may be performed at the same time as other operations in FIGS. 10A, 10B, and 10C. Similarly, some of the operations performed in FIGS. 12A and 12B may be performed at the same time as other operations in FIGS. 12A and 12B.

Figure 15:
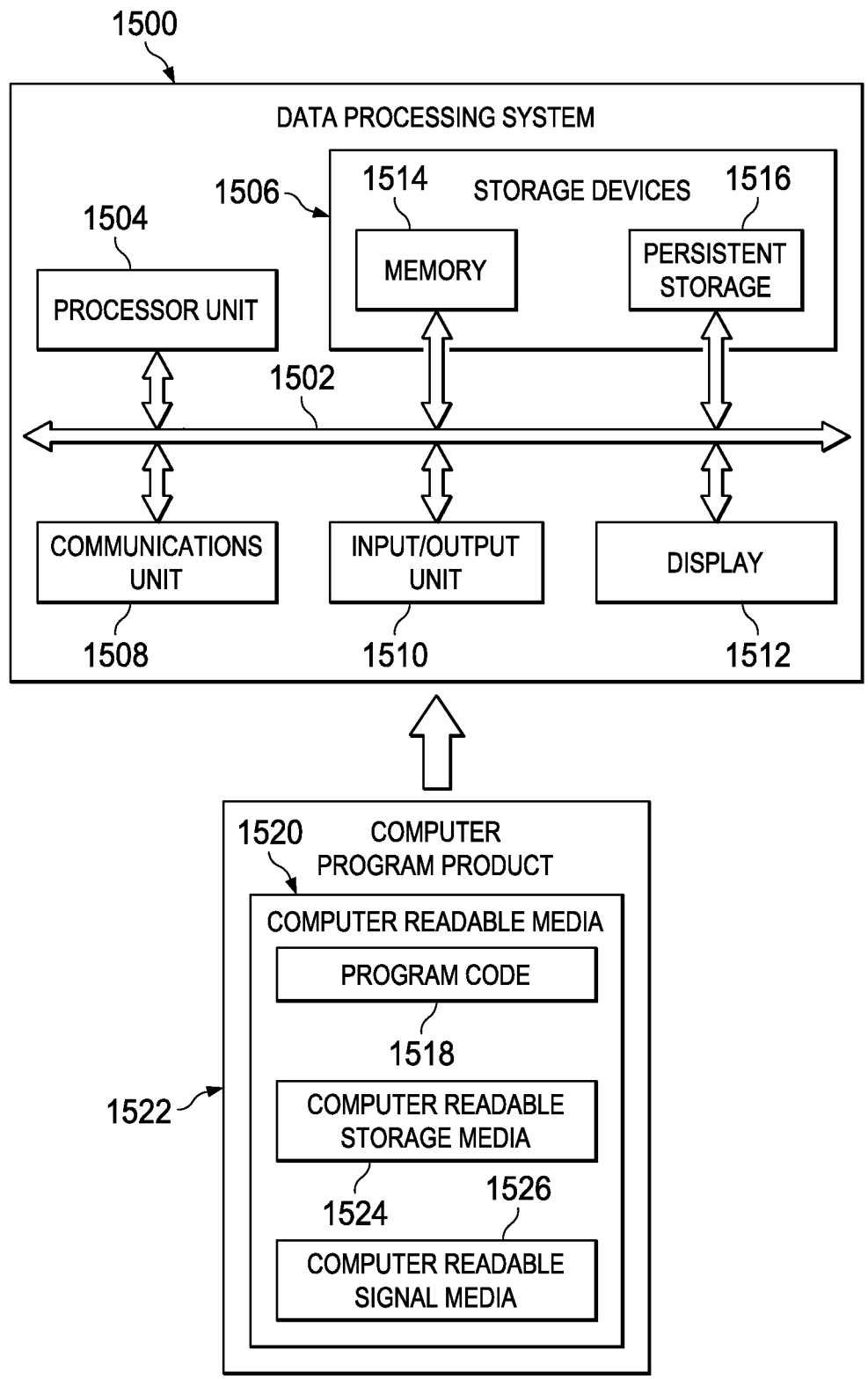
FIG. 15 is an illustration of a data processing system in the form of a block diagram in accordance with an illustrative embodiment.

Turning now to FIG. 15, an illustration of a data processing system in the form of a block diagram is depicted in accordance with an illustrative embodiment. Data processing system 1500 may be used to implement at least one of a computer in computer system 102, data manager 104, continuum generator 105, or output manager 106 in FIG. 1. Data processing system 1500 may be used to implement, for example, at least one of product chemical profile system 101, data miner 152, or data manager 104 in FIG. 1.

As depicted, data processing system 1500 includes communications framework 1502, which provides communications between processor unit 1504, storage devices 1506, communications unit 1508, input/output unit 1510, and display 1512. In some cases, communications framework 1502 may be implemented as a bus system.

Processor unit 1504 is configured to execute instructions for software to perform a number of operations. Processor unit 1504 may comprise a number of processors, a multi-processor core, and/or some other type of processor, depending on the implementation. In some cases, processor unit 1504 may take the form of a hardware unit, such as a circuit system, an application specific integrated circuit (ASIC), a programmable logic device, or some other suitable type of hardware unit.

Instructions for the operating system, applications, and/or programs run by processor unit 1504 may be located in storage devices 1506. Storage devices 1506 may be in communication with processor unit 1504 through communications framework 1502. As used herein, a storage device, also referred to as a computer readable storage device, is any piece of hardware capable of storing information on a temporary and/or permanent basis. This information may include, but is not limited to, data, program code, and/or other information.

Memory 1514 and persistent storage 1516 are examples of storage devices 1506. Memory 1514 may take the form of, for example, a random access memory or some type of volatile or non-volatile storage device. Persistent storage 1516 may comprise any number of components or devices. For example, persistent storage 1516 may comprise a hard drive, a flash memory, a rewritable optical disk, a rewritable magnetic tape, or some combination of the above. The media used by persistent storage 1516 may or may not be removable.

Communications unit 1508 allows data processing system 1500 to communicate with other data processing systems and/or devices. Communications unit 1508 may provide communications using physical and/or wireless communications links.

Input/output unit 1510 allows input to be received from and output to be sent to other devices connected to data processing system 1500. For example, input/output unit 1510 may allow user input to be received through a keyboard, a mouse, and/or some other type of input device. As another example, input/output unit 1510 may allow output to be sent to a printer connected to data processing system 1500.

Display 1512 is configured to display information to a user. Display 1512 may comprise, for example, without limitation, a monitor, a touch screen, a laser display, a holographic display, a virtual display device, and/or some other type of display device.

In this illustrative example, the processes of the different illustrative embodiments may be performed by processor unit 1504 using computer-implemented instructions. These instructions may be referred to as program code, computer usable program code, or computer readable program code and may be read and executed by one or more processors in processor unit 1504.

In these examples, program code 1518 is located in a functional form on computer readable media 1520, which is selectively removable, and may be loaded onto or transferred to data processing system 1500 for execution by processor unit 1504. Program code 1518 and computer readable media 1520 together form computer program product 1522. In this illustrative example, computer readable media 1520 may be computer readable storage media 1524 or computer readable signal media 1526.

Computer readable storage media 1524 is a physical or tangible storage device used to store program code 1518 rather than a medium that propagates or transmits program code 1518. Computer readable storage media 1524 may be, for example, without limitation, an optical or magnetic disk or a persistent storage device that is connected to data processing system 1500.

Alternatively, program code 1518 may be transferred to data processing system 1500 using computer readable signal media 1526. Computer readable signal media 1526 may be, for example, a propagated data signal containing program code 1518. This data signal may be an electromagnetic signal, an optical signal, and/or some other type of signal that can be transmitted over physical and/or wireless communications links.

The illustration of data processing system 1500 in FIG. 15 is not meant to provide architectural limitations to the manner in which the illustrative embodiments may be implemented. The different illustrative embodiments may be implemented in a data processing system that includes components in addition to or in place of those illustrated for data processing system 1500. Further, components shown in FIG. 15 may be varied from the illustrative examples shown.

Thus, the illustrative embodiments provide a method and apparatus for processing different types of information for a product in different types of formats to generate indivisible data elements for a database. These data elements may be used to generate a chemical profile for the product, as well as other types of outputs.

The method of collecting, processing, linking, and storing data described in the various illustrative embodiments described above may improve the efficiency of generating chemical profiles for a product. Data elements may be generated for the different hierarchical levels in the hierarchy of a product such that the data elements for a particular hierarchical level are logically independent from the data elements of the hierarchical levels above that particular hierarchical level. In this manner, the data elements for a particular parameter at a particular hierarchical level may be used for generating a variety of different types of reports.

The product-to-chemical continuum described by the various illustrative embodiments, such as product-to-chemical continuum 131 in FIGS. 1 and 6 may allow root cause analysis and corrective action planning for complex products that was not previously practical or even feasible to be performed. For example, the product-to-chemical continuum and, in particular, the pathway segments in the product-to-chemical continuum may allow extremely fast and easy traversal through vast amounts of data in order to identify extremely detailed pieces of information.

With this type of product-to-chemical continuum, root cause analysis and corrective action planning may be performed for complex products down to an extremely fine level of detail was previously impossible. This fine level of detail may be so fine as the individual chemical elements in the various chemical compounds that make up materials and parts in a complex product or that are used during operations such as finishing operations, curing operations, painting operations, cleaning operations, testing operations, and other types of operations. The product-to-chemical continuum provides a capability to perform root cause analysis and corrective action planning with a level of accuracy that was not previously possible.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented system comprising:
   a computing device configured to obtain product-related information for tracking, reporting, and verifying compliance of a chemical profile with respect to contractual, regulatory, and industry standards by:
   the computing device implementing a data manager that:
      transforms information obtained from a plurality of different sources into processed product data with a plurality of levels, wherein the information is related to a product comprising an aerospace vehicle; and
      identifies callouts and contexts in the processed product data;
   the computing device implementing a continuum generator that generates a product-to-chemical continuum by creating callout-context pathway segments between the plurality of levels of the processed product data based on the callouts and the contexts; and the computing device implementing an output manager that:

transforms a query request for product information into a set of context search parameters, which is used to traverse the product-to-chemical continuum through the callout-context pathway segments that span the plurality of levels, extracts the product information that matches the set of context search parameters from the product-to-chemical continuum, wherein the callout-context pathway segments reduce processing resources and time needed to obtain the product information, and generates an output file containing the product information extracted from the product-to-chemical continuum in which the output file includes a chemical profile for a particular configuration of the product in which the chemical profile identifies a weight of at least one chemical used in the particular configuration of the product, and wherein the weight is based on geometry data generated from a solid three-dimensional computer model of the product, the geometry data including volume data and surface area data for the product, wherein the callout-context pathway segments between the plurality of levels of the processed product data reduce processing resources and time needed to extract the product information and generate the output file containing the product information.

2. The computer-implemented system of claim 1, wherein traversing a pathway comprised of at least a portion of the callout-context pathway segments and a portion of context-callout pathway segments in the product-to-chemical continuum based on the set of context search parameters enables the output manager to generate an output file with a speed and efficiency that thereby reduces an overall time needed by an operator to perform a number of operations related to at least one of a design, manufacturing, certification, testing, or maintenance of the product.

3. The computer-implemented system of claim 1, wherein the plurality of levels of the processed product data includes a product level, a part level, a material level, a process level, a chemical level, and a regulation level.

4. The computer-implemented system of claim 1, wherein each of the callouts comprises:
a set of callout attribute-value pairs that define a reference to a portion of a data item.

5. The computer-implemented system of claim 4, wherein each of the contexts comprises:
a set of context attribute-value pairs that identify a portion of data in a data item at one of the plurality of levels.

6. The computer-implemented system of claim 5, wherein the continuum generator matches the set of callout attribute-value pairs for one of the callouts at a first level in the plurality of levels to the set of context attribute-value pairs for one of the contexts at a second level in the plurality of levels to create a callout-context pathway segment between the first level and the second level in which the callout-context pathway segment becomes one of a plurality of pathway segments in the product-to-chemical continuum.

7. The computer-implemented system of claim 5, wherein the callouts comprise:

an embedded callout within the portion of data in the data item identified by the set of context attribute-value pairs for a particular context in the contexts.

8. The computer-implemented system of claim 7, wherein one of the data manager and the continuum generator creates a context-callout pathway segment between the particular context and the embedded callout in which the context-callout pathway segment becomes one of a plurality of pathway segments in the product-to-chemical continuum.

9. The computer-implemented system of claim 8, wherein the plurality of pathway segments in the product-to-chemical continuum allows the output manager to extract the product information from the product-to-chemical continuum by traversing through any portion of the plurality of levels using any number of pathway segments in the plurality of pathway segments.

10. The computer-implemented system of claim 1, wherein the plurality of different sources includes at least two of a bill of materials system, a standard parts data system, a process and specifications system, a manufacturing system, a regulatory organization, a government reference, an environmental health system, an occupational safety and health system, a supplied parts system, a geometry system, a weights system, and a design system and wherein the information obtained from one source in the plurality of different sources has a different format compared to the information from at least one other source in the plurality of different sources.

11. A computer-implemented system for obtaining product related information, the computer-implemented system comprising:

a computer implementing a data manager that transforms information obtained from a plurality of different sources in different formats into a plurality of levels of processed product data having a selected format and identifies a plurality of callouts and a plurality of contexts at each level in the plurality of levels of processed product data, wherein the information is related to a product comprising an aerospace vehicle, wherein the plurality of levels of processed product data includes:

a product level;

a part level, the part level different than the product level;

a material level, the material level different than the part level, and different than the product level;

a process level, the process level different than the material level, different than the part level, and different than the product level;

a chemical level, the chemical level different than the process level, different than the material level, different than the part level, and different than the product level; and a regulation level, the regulation level different than the chemical level, different than the process level, different than the material level, different than the part level, and different than the product level;

the computer implementing a continuum generator that creates callout-context pathway segments between the plurality of levels of processed product data using the plurality of callouts and the plurality of contexts at each level in the plurality of levels of processed product data to generate a product-to-chemical continuum and stores the product-to-chemical continuum that comprises a plurality of pathway segments that include the callout-context pathway segments in a data store; and the computer implementing an output manager that transforms a query request for desired information related to the product into a set of context search parameters, traverses a pathway in the product-to-chemical continuum formed by at least a portion of the callout-context pathway segments based on the set of context search parameters to extract the desired information related to the product, and generates an output file containing the desired information extracted from the product-to-chemical continuum in which the output file includes a chemical profile for a particular configuration of the product in which the chemical profile identifies a weight of at least one chemical used in the particular configuration of the product, and wherein the weight is based on geometry data generated from a solid three-dimensional computer model of the product, the geometry data including volume data and surface area data for the product, wherein the callout-context pathway segments between the plurality of levels of processed product data reduce processing resources and time needed by the computer-implemented system to obtain the desired information and generate the output file containing the desired information.

12. A computer-implemented method for obtaining product related information, the method comprising:
a hardware processor:
transforming information obtained from a plurality of different sources into processed product data with a plurality of levels, wherein the information is related to a product comprising an aerospace vehicle;
identifying callouts and contexts in the processed product data;
generating a product-to-chemical continuum by creating callout-context pathway segments between the plurality of levels of the processed product data based on the callouts and the contexts identified, the callout-context pathway segments linking various types of data items at different levels along the product-to-chemical continuum, wherein each of the callout-context pathway segments comprises a link between a callout and a context, the context different than the callout;
transforming a query request for product information into a set of context search parameters, which is used to traverse the product-to-chemical continuum through the callout-context pathway segments that span the plurality of levels;
extracting the product information that matches the set of context search parameters from the product-to-chemical continuum, wherein the callout-context pathway segments reduce processing resources and time needed to obtain the product information; and
generating an output file containing the product information extracted from the product-to-chemical continuum in which the output file includes a chemical profile for a particular configuration of the product in which the chemical profile identifies a weight of at least one chemical used in the particular configuration of the product, and wherein the weight is based on geometry data generated from a solid three-dimensional computer model of the product, the geometry data including volume data and surface area data for the product, wherein the callout-context pathway segments between the plurality of levels of the processed product data reduce processing resources and time needed to generate the output file containing the product information.

13. The computer-implemented method of claim 12 further comprising the hardware processor:
performing a number of operations related to at least one of a design, manufacturing, certification, testing, or maintenance of the product using the output file, wherein traversing a pathway in the product-to-chemical continuum based on the set of context search parameters enables the output file to be generated with a speed and efficiency that thereby reduces an overall time needed by an operator to perform the number of operations.

14. The computer-implemented method of claim 13, wherein performing the number of operations comprises:
changing a chemical composition of at least one part that makes up the product during manufacturing based on the output file.

15. The computer-implemented method of claim 12, wherein identifying the callouts and the contexts in the processed product data comprises:
identifying a set of callout attribute-value pairs in the plurality of levels as a callout, wherein the set of callout attribute-value pairs defines a reference; and
identifying a set of context attribute-value pairs that identifies a portion of data in a data item.

16. The computer-implemented method of claim 15, wherein generating the product-to-chemical continuum comprises:
matching the set of callout attribute-value pairs for the callout at a first level in the plurality of levels to the set of context attribute-value pairs for a context at a second level in the plurality of levels to create a callout-context pathway segment between the first level and the second level in which the callout-context pathway segment becomes one of a plurality of pathway segments in the product-to-chemical continuum.

17. The computer-implemented method of claim 16 further comprising the hardware processor:
identifying an embedded callout within the portion of data in the data item identified by the context at the second level in which the embedded callout becomes one of the callouts; and
creating a context-callout pathway segment between the context at the second level and the embedded callout in which the context-callout pathway segment becomes one of the plurality of pathway segments in the product-to-chemical continuum.

18. The computer-implemented method of claim 12, wherein transforming the information related to the product that is obtained from the plurality of different sources comprises:
parsing and formatting the information received from the plurality of different sources in different formats according to a selected format for a staging data store to form the processed product data; and
loading the processed product data into the staging data store, wherein a continuum generator processes the processed product data in the staging data store to create the callout-context pathway segments and generate the product-to-chemical continuum.

* * * * *